United States Patent
Bessant et al.

(10) Patent No.: US 11,013,268 B2
(45) Date of Patent: *May 25, 2021

(54) AEROSOL-GENERATING SYSTEM WITH ELECTRODES AND SENSORS

(71) Applicant: Altria Client Services LLC, Richmond, VA (US)

(72) Inventors: Michel Bessant, Neuchatel (CH); Jacques Robert, Le Mont-sur-Lausanne (CH)

(73) Assignee: Altria Client Services LLC, Richmond, VA (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/908,074

(22) Filed: Feb. 28, 2018

(65) Prior Publication Data

US 2018/0242644 A1    Aug. 30, 2018

Related U.S. Application Data

(63) Continuation of application No. PCT/EP2018/053725, filed on Feb. 14, 2018.

(30) Foreign Application Priority Data

Feb. 28, 2017    (EP) .................................... 17158521

(51) Int. Cl.
*A24F 47/00*    (2020.01)
*H05B 3/03*    (2006.01)
(Continued)

(52) U.S. Cl.
CPC ............ *A24F 47/008* (2013.01); *G01F 23/22* (2013.01); *G01F 23/263* (2013.01);
(Continued)

(58) Field of Classification Search
CPC ..... A24B 15/167; A24F 47/008; G01F 23/22; G01F 23/263; H05B 1/0227;
(Continued)

(56) References Cited

U.S. PATENT DOCUMENTS

| | | |
|---|---|---|
| 4,417,473 A | 11/1983 | Tward et al. |
| 5,083,383 A | 1/1992 | Heger |

(Continued)

FOREIGN PATENT DOCUMENTS

| | | |
|---|---|---|
| DE | 19645970 A1 | 5/1998 |
| EP | 2468116 A1 | 6/2012 |

(Continued)

OTHER PUBLICATIONS

International Preliminary Report on Patentability for International Application No. PCT/EP2018/053725 dated Sep. 12, 2019.

(Continued)

*Primary Examiner* — Dana Ross
*Assistant Examiner* — Ket D Dang
(74) *Attorney, Agent, or Firm* — Harness, Dickey & Pierce, P.L.C.

(57) ABSTRACT

An aerosol-generating system includes a liquid storage portion for holding a liquid aerosol-forming substrate; a pair of electrodes arranged adjacent to or in the liquid storage portion; a sensor configured to sense an orientation of the liquid storage portion; and a control system configured to, measure an electrical quantity between the pair of electrodes, receive orientation information from the sensor, and determine an amount of liquid aerosol-forming substrate held in the liquid storage portion based on electrical quantity information measured between the pair of electrodes and the orientation information received from the sensor, wherein (Continued)

the liquid storage portion has a length and the pair of electrodes extend substantially the length of the liquid storage portion.

15 Claims, 10 Drawing Sheets

(51) Int. Cl.
    H05B 3/34      (2006.01)
    G01F 23/22     (2006.01)
    G01F 23/26     (2006.01)
    H05B 1/02      (2006.01)
    H05B 6/10      (2006.01)
    A24B 15/167    (2020.01)

(52) U.S. Cl.
    CPC ............. *H05B 1/0227* (2013.01); *H05B 3/03* (2013.01); *H05B 3/34* (2013.01); *H05B 6/108* (2013.01); *A24B 15/167* (2016.11); *H05B 2203/021* (2013.01)

(58) Field of Classification Search
    CPC ........ H05B 2203/006; H05B 2203/021; H05B 3/03; H05B 3/20; H05B 3/34; H05B 6/108
    USPC ....... 219/601, 607, 609, 611, 624, 628, 629, 219/630, 634, 635, 643, 644, 675; 131/328, 329, 330; 392/387, 386, 390, 392/394, 398, 401, 404, 441, 444, 447, 392/497, 502
    See application file for complete search history.

(56) References Cited

U.S. PATENT DOCUMENTS

| | | | | |
|---|---|---|---|---|
| 5,095,921 | A * | 3/1992 | Losee | A24F 47/008 131/194 |
| 5,530,225 | A * | 6/1996 | Hajaligol | A24F 47/008 131/194 |
| 6,474,156 | B1 | 11/2002 | Endo et al. | |
| 2004/0029366 | A1 | 2/2004 | Jakoby | |
| 2011/0083504 | A1 | 4/2011 | Unger | |
| 2011/0113878 | A1 * | 5/2011 | Ohshima | G01F 23/266 73/304 C |
| 2013/0319435 | A1 * | 12/2013 | Flick | A61M 11/042 131/328 |
| 2014/0000638 | A1 | 1/2014 | Sebastian et al. | |
| 2014/0352428 | A1 * | 12/2014 | Kato | G01F 23/268 73/304 C |
| 2015/0122015 | A1 | 5/2015 | Leppard | |
| 2015/0235546 | A1 | 8/2015 | Stapleford | |
| 2015/0257445 | A1 * | 9/2015 | Henry, Jr. | A24F 47/008 131/328 |
| 2015/0366266 | A1 | 12/2015 | Chen | |
| 2016/0025545 | A1 * | 1/2016 | Saltzgiver | G01F 23/2962 73/304 C |
| 2016/0029698 | A1 * | 2/2016 | Xiang | A24F 47/008 131/328 |
| 2016/0235122 | A1 * | 8/2016 | Krietzman | H05B 1/0225 |
| 2016/0310684 | A1 | 10/2016 | McCullough | |
| 2016/0345628 | A1 * | 12/2016 | Sabet | H04M 1/72527 |
| 2017/0245552 | A1 | 8/2017 | Reevell | |
| 2018/0049469 | A1 * | 2/2018 | Kaufman | A24F 47/008 |
| 2018/0177238 | A1 * | 6/2018 | Bessant | G01F 23/263 |
| 2018/0242644 | A1 | 8/2018 | Bessant et al. | |

FOREIGN PATENT DOCUMENTS

| | | |
|---|---|---|
| EP | 2756859 A1 | 7/2014 |
| GB | 2533652 A | 6/2016 |
| WO | WO-2015/177046 A1 | 11/2015 |
| WO | WO-2017137505 A1 | 8/2017 |
| WO | WO-2018/114849 A1 | 6/2018 |

OTHER PUBLICATIONS

International Search Report for International Application No. PCT/EP2018/053725 dated May 18, 2018.

Written Opinion of the International Searching Authority for International Application No. PCT/EP2018/053725 dated May 18, 2018.

Extended European Search Report #17158521.9 dated Sep. 13, 2017.

European Office Action dated Oct. 8, 2020 issued in corresponding European Patent Application No. 18705147.9.

Extended European Search Report #16206381.2 dated Jun. 9, 2017.

Jacques Robert et al. "A Second-Order High-Resolution Incremental A/D Converter with Offset and Charge Injection Compensation". IEEE Journal of Solid-State Circuits, vol. 23, No. 3. Jun. 1988. pp. 736-741.

Alexander V. Mamishev et al. "Interdigital Sensors and Transducers". Proceedings of the IEEE, vol. 92, No. 5. May 2004. pp. 808-845.

David Wang. "TI Designs: Capacitive-Based Liquid Level Sensing Sensor Reference Design". Texas Instruments Incorporated. Jan. 2015. pp. 1-23.

International Preliminary Report and Written Opinion for corresponding PCT Application No. PCT/EP2017/083386 dated Jul. 4, 2019.

Notice of Allowance in co-pending U.S. Appl. No. 15/850,278 dated Nov. 30, 2020.

* cited by examiner

AEROSOL-GENERATING SYSTEM WITH ELECTRODES AND SENSORS

CROSS-REFERENCE TO RELATED APPLICATIONS

This application is a continuation of, and claims priority to, international application no. PCT/EP2018/053725, filed on Feb. 14, 2018, and further claims priority under 35 U.S.C. § 119 to European Patent Application No. 17158521.9, filed Feb. 28, 2017, the entire contents of each of which are incorporated herein by reference.

BACKGROUND

1. Field

At least some example embodiments are directed to electrically operated aerosol-generating systems and cartridges for electrically operated aerosol-generating systems.

2. Related Art

Electrically operated aerosol-generating systems typically comprise a liquid aerosol-forming substrate, which is atomized to form an aerosol. Electrically operated aerosol-generating systems often comprise a power supply, a liquid-storage portion for holding a supply of liquid aerosol-forming substrate and an atomizer. A common type of atomizer used in such systems comprises a coil of heater wire wound around an elongate wick soaked in liquid aerosol-forming substrate. Another common type of atomizer used in such systems comprises a heating mesh.

SUMMARY

According to at least some example embodiments, an aerosol-generating system includes a liquid storage portion for holding a liquid aerosol-forming substrate; a pair of electrodes arranged adjacent to or in the liquid storage portion; a sensor configured to sense an orientation of the liquid storage portion; and a control system configured to, measure an electrical quantity between the pair of electrodes, receive orientation information from the sensor, and determine an amount of liquid aerosol-forming substrate held in the liquid storage portion based on electrical quantity information measured between the pair of electrodes and the orientation information received from the sensor, wherein the liquid storage portion has a length and the pair of electrodes extend substantially the length of the liquid storage portion.

BRIEF DESCRIPTION OF THE DRAWINGS

The above and other features and advantages of example embodiments will become more apparent by describing in detail example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 9a shows a schematic illustration of the cartridge of FIG. 2 holding pre-dispersion formulation in an upright vertical orientation;

FIG. 9b shows a schematic illustration of the pre-dispersion formulation held in the cartridge of FIG. 9a;

FIG. 9c shows a schematic illustration of the cartridge of FIG. 2 holding pre-dispersion formulation in a horizontal orientation;

FIG. 9d shows a schematic illustration of the pre-dispersion formulation held in the cartridge of FIG. 9c;

FIG. 10a shows a schematic illustration of the cartridge of FIG. 2 holding pre-dispersion formulation in a non-vertical and non-horizontal orientation;

FIG. 10b shows a schematic illustration of the pre-dispersion formulation held in the cartridge of FIG. 10a;

FIG. 10c shows a schematic illustration of the cartridge of FIG. 2 holding pre-dispersion formulation in another non-vertical and non-horizontal orientation;

FIG. 10d shows a schematic illustration of the pre-dispersion formulation held in the cartridge of FIG. 10a;

FIG. 12a shows a plan view of a cartridge according to another embodiment of at least some example embodiments that is suitable for use in the dispersion-generating system of FIG. 1;

FIG. 12b shows a perspective view of the cartridge of FIG. 12a;

DETAILED DESCRIPTION OF EXAMPLE EMBODIMENTS

Figure 1:
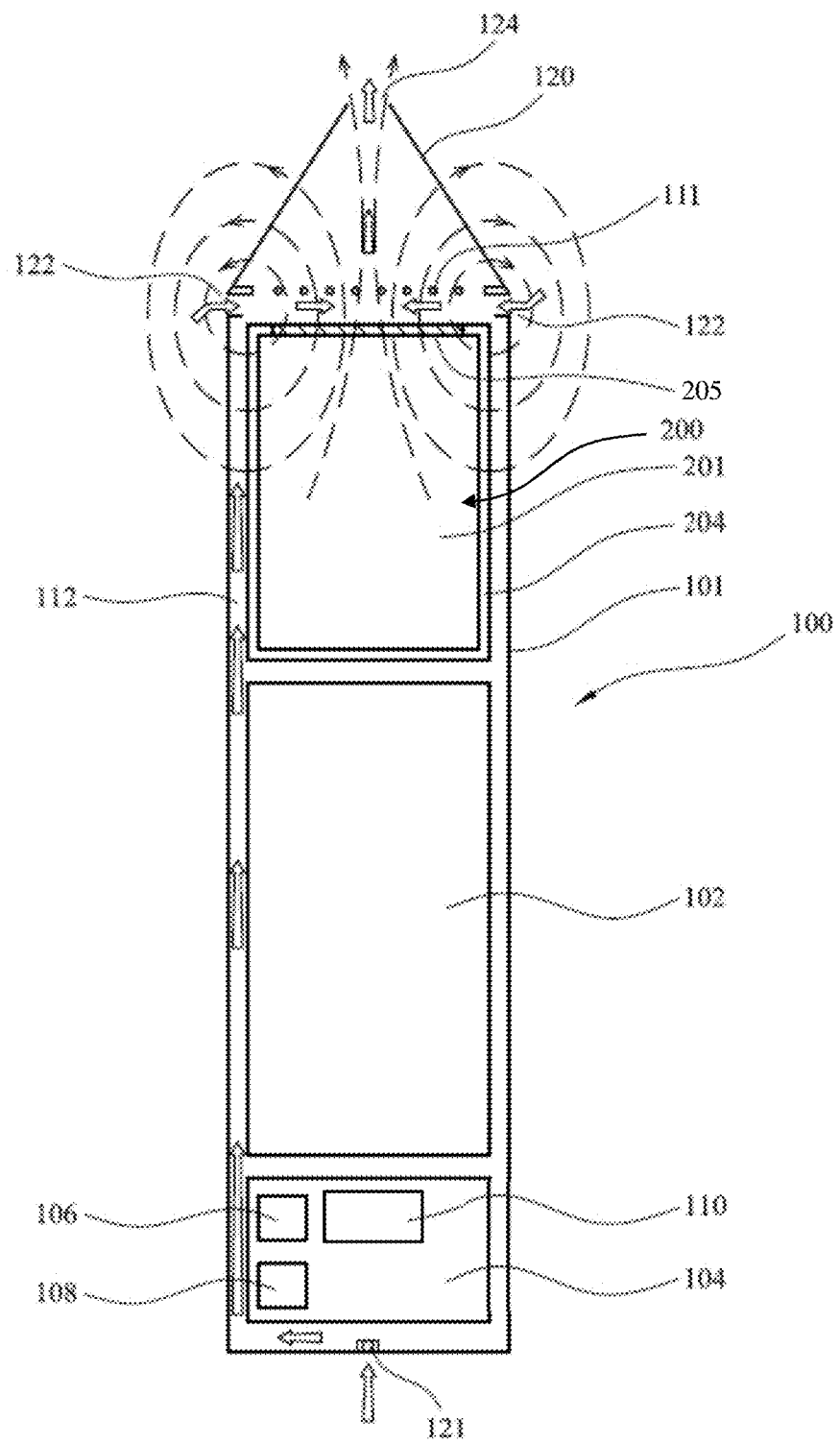
FIG. 1 shows a schematic illustration of an example dispersion-generating system according to an embodiment of at least some example embodiments.

Detailed example embodiments are disclosed herein. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments of tare capable of various modifications and alternative forms, embodiments thereof are shown by way of example in the drawings and will herein be described in detail. It should be understood, however, that there is no intent to limit example embodiments to the particular forms disclosed, but to the contrary, example embodiments of the are to cover all modifications, equivalents, and alternatives falling within the scope of example embodiments of the. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it may be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments of the. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Example embodiments are described herein with reference to schematic illustrations of idealized embodiments (and intermediate structures). As such, variations from the shapes of the illustrations as a result, for example, of manufacturing techniques and/or tolerances, are to be expected. Thus, example embodiments of the should not be construed as limited to the particular shapes of regions illustrated herein but are to include deviations in shapes that result, for example, from manufacturing.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure is illustrated in a cross-sectional view, an electronic device may include a plurality of the device structures, as would be illustrated by a plan view of the electronic device. The plurality of device structures may be arranged in an array and/or in a two-dimensional pattern.

Liquid aerosol-forming substrate is consumed during use of an aerosol-generating system and often requires replacing, either by refilling a liquid storage portion or by replacing a cartridge comprising a liquid storage portion.

It would be desirable for an aerosol-generating system to provide an accurate determination of the amount of liquid aerosol-forming substrate held in a liquid storage portion. It would be desirable for an aerosol-generating system to accurately monitor the amount of liquid aerosol-forming substrate that is held in the liquid storage portion.

In a first aspect of one or more example embodiments, there is provided an aerosol-generating system comprising: a liquid storage portion for holding a liquid aerosol-forming substrate; a pair of electrodes arranged adjacent to or in the liquid storage portion; a sensor configured to sense the orientation of the liquid storage portion; and a control system. The control system is configured to: measure an electrical quantity between the pair of electrodes; receive orientation information from the sensor; and determine the amount of liquid aerosol-forming substrate held in the liquid storage portion based on electrical quantity information measured between the pair of electrodes and the orientation information received from the sensor.

Providing an aerosol-generating system with means for determining the orientation of the liquid storage portion is desirable for several reasons. In particular, the accuracy and reliability of estimates of the amount of liquid aerosol-forming substrate held in a liquid storage portion may be improved if the estimate is made when the liquid storage portion is at particular orientations, as described in more detail later on. Some aerosol-generating systems may generate an improved aerosol when the liquid storage portion is at a particular orientation, such as when the liquid storage portion is substantially upright or horizontal. In these systems, it may be beneficial for the aerosol-generating system to indicate to when the system is at a desired or, alternatively, optimum orientation for aerosol-generation.

As used herein in the present disclosure, the term 'amount' is used to describe the mass, quantity or proportion of liquid aerosol-forming substrate held in the liquid storage portion. The determined amount of liquid aerosol-forming substrate held in the liquid storage portion may comprise an absolute or a relative value. The determined amount of liquid aerosol-forming substrate may comprise a volume, such as a value in liters. The determined amount of liquid aerosol-forming substrate held in the liquid storage portion may comprise a fraction or a percentage, for example, with 1 or 100% indicating a full liquid storage portion and 0 or 0% indicating an empty liquid storage portion.

As used herein in the present disclosure, the term 'electrical quantity' is used to describe any electrical property, parameter or attribute that can be quantified by measurement. For example, suitable 'electrical quantities' include current, voltage, impedance, capacitance and resistance. The control system may be configured to measure at least one of impedance, capacitance and resistance between the pair of electrodes.

The liquid storage portion may be configured to hold both liquid aerosol-forming substrate and air. The liquid aerosol-forming substrate may have substantially different electrical properties to air. The electrical properties of the first and second portions of the liquid storage portion may depend on the amount of liquid aerosol-forming substrate and the amount of air held in the liquid storage portion. The liquid storage portion may also comprise one or more carrier materials for holding the liquid aerosol-forming substrate and a housing for holding the liquid aerosol-forming substrate. The liquid aerosol-forming substrate, air, carrier material and housing may have different electrical properties.

The electrical properties of the liquid storage portion may change during use as the ratio of liquid aerosol-forming substrate to air held in the liquid storage portion changes. When the liquid storage portion is filled with liquid aerosol-forming substrate, the liquid storage portion may hold predominantly liquid aerosol-forming substrate. In use, liquid aerosol-forming substrate may be consumed from the liquid storage portion and replaced with air. When the liquid storage portion is empty, the liquid storage portion may hold predominantly air. Where the liquid storage portion comprises a carrier material, the liquid storage portion may hold a combination of liquid aerosol-forming substrate, air and the carrier material. The liquid storage portion may be refilled, replacing air in the liquid storage portion with liquid aerosol-forming substrate.

The liquid storage portion may comprise an electrical load. The liquid storage portion may comprise at least one of a resistive load and a capacitive load. Advantageously, electrical quantities of resistive and capacitive loads may be measured without requiring complex electronics.

The control system is configured to determine the amount of liquid aerosol-forming substrate held in the liquid storage portion based on electrical quantity information measured between the pair of electrodes and orientation information received from the sensor.

As used herein in the present disclosure, the term 'orientation' is used to describe the inclination, tilt or angle of the liquid storage portion. The determined orientation of the liquid storage portion may comprise an absolute value or a relative value. Typically, the determined orientation may comprise an angle, such as a value in degrees or radians. However, in some embodiments, the determined orientation may comprise an indication of whether the liquid storage portion is at one or more particular orientations or inclinations. The determined orientation may comprise an indication of whether the liquid storage portion is not at the one or more particular orientations or inclinations. In some embodiments, the control system may be configured to determine whether the liquid storage portion is at a horizontal orientation and whether the liquid storage portion is not at a horizontal orientation. In some embodiments, the control system may be configured to determine whether the liquid storage portion is at a horizontal orientation, whether the liquid storage portion is at a vertical orientation and whether the liquid storage portion is neither at a horizontal orientation nor a vertical orientation.

In some embodiments, the control system may be configured to determine the orientation of the liquid storage portion based on the orientation information from the sensor. In these embodiments, control system may be configured to determine the amount of liquid aerosol-forming substrate held in the liquid storage portion based on the determined orientation of the liquid storage portion.

The determined orientation may be an angle of inclination of the liquid storage portion. The angle of inclination of the liquid storage portion may be any suitable angle relative to the liquid storage portion. For example, the angle of inclination may be the angle between the vertical, defined by the direction of influence of gravity, and a longitudinal axis of the liquid storage portion. For example, the angle of inclination may be the angle between the horizontal and a transverse axis of the liquid storage portion.

The control system may be configured to determine the amount of liquid aerosol-forming substrate held in the liquid storage portion at any suitable time. The control system may be configured to determine the amount of liquid aerosol-forming substrate held in the liquid storage portion when the aerosol-generating system is switched on. The control system may be configured to determine the amount of liquid aerosol-forming substrate held in the liquid storage portion periodically at predetermined or, alternatively, desired intervals. The control system may be configured to determine the amount of liquid aerosol-forming substrate held in the liquid storage portion when prompted.

In some embodiments, the relationship between the measured electrical quantity between the pair of electrodes may be known only for one or more particular orientations or inclinations. In some embodiments, the control system may be configured to determine the amount of liquid aerosol-forming substrate held in the liquid storage portion if the control system determines that the liquid storage portion is at one or more particular orientations or inclinations. In one example, the control system may be configured to determine the amount of liquid aerosol-forming substrate held in the liquid storage portion if the liquid storage portion is determined to be substantially horizontal. In another example, the control system may be configured to determine the amount of liquid aerosol-forming substrate held in the liquid storage portion if the liquid storage portion is determined to be either substantially horizontal or substantially vertical. This may improve the accuracy and reliability of the determined amount value.

In some embodiments, the control system is configured to compare the orientation information received from the sensor, or the orientation determined from the orientation information by the control system, to one or more reference orientation values. The control system may be configured to determine the amount of liquid aerosol-forming substrate held in the liquid storage portion if the orientation information or the determined orientation matches a reference orientation value.

The one or more reference orientation values may be indicative of the liquid storage portion being at a particular orientation, such as horizontal or vertical. Each reference orientation value may be associated with reference electrical quantity information and reference amount information. The reference electrical quantity information and reference amount information may be different for each reference orientation value.

In some embodiments, the control system may be further configured to substantially prevent or inhibit the determination of the amount of liquid aerosol-forming substrate held in the liquid storage portion based on the orientation information received from the sensor. Where the control system compares the orientation information received from the sensor to one or more reference orientation values, the control system may be configured to prevent or inhibit the determination of the amount of liquid aerosol-forming substrate held in the liquid storage portion if the orientation information does not match a reference orientation value. This may improve the reliability of the determination of the amount of liquid aerosol-forming substrate held in the liquid storage portion.

In some embodiments, the control system may be configured to determine the amount of liquid aerosol-forming substrate held in the liquid storage portion by comparison. Using comparison to determine the amount of liquid aerosol-forming substrate held in the liquid storage portion may be advantageous, as the control system may be able to perform a comparison faster than a calculation. The control system may be configured to compare the electrical quantity information measured between the pair of electrodes to reference electrical quantity information stored in the control system.

The control system may be configured to compare the orientation information received from the sensor to the reference orientation information. On determining a match between the measured orientation information and the reference orientation information, the control system may be configured to compare the measured electrical quantity information to the reference electrical quantity information associated with the matched reference orientation information. On determining a match between the measured electrical quantity information and the reference electrical quantity information, the control system may be configured to determine the amount of liquid aerosol-forming substrate held in the liquid storage portion based on the reference amount information associated with the matched reference electrical quantity information.

The reference information may be stored in a memory of the control system. The reference electrical quantity information may be electrical quantity information measured by the control system and stored in a memory of the control system. The reference amount information may comprise one or more of volume information and fractional fill information.

The associations between the reference orientation information, the reference electrical quantity information and the reference amount information may enable the determination of the amount of liquid aerosol-forming substrate held in the liquid storage portion to be reliable.

The reference information may comprise a plurality of ranges. Each range of the reference orientation information may be associated with a value or a range of reference electrical quantity information. Each range of the reference electrical quantity information may be associated with a value or a range of reference amount information. The control system may be configured to compare received orientation information to the stored ranges of reference orientation information and to match the received value to a stored range. The control system may be configured to compare the measured electrical quantity information to the stored ranges of reference electrical quantity information and to match the measured electrical quantity information to a stored range.

The reference information may be stored in a lookup table. The lookup table may comprise stored reference orientation information, reference electrical quantity information and reference amount information. The reference orientation information may be associated with the reference electrical quantity information. The reference electrical quantity information may be associated with the reference amount information.

The control system may be configured to determine the amount of liquid aerosol-forming substrate held in the liquid storage portion based on electrical quantity information measured between the pair of electrodes and the orientation information received from the sensor.

At particular orientations, the electrical quantity measured between the pair of electrodes may change in a predictable manner with the amount of liquid aerosol-forming substrate held in the liquid storage portion. In one example, the amount of liquid aerosol-forming substrate held in the liquid storage portion may be substantially inversely proportional to the resistance measured by the control system between the pair of electrodes when the liquid storage portion is in a substantially horizontal orientation. In another example, the amount of liquid aerosol-forming substrate held in the liquid storage portion may be substantially proportional to the capacitance measured by the control system between the pair of electrodes when the liquid storage portion is in a substantially horizontal orientation.

In some embodiments, the control system may be configured to determine the amount of liquid aerosol-forming substrate held in the liquid storage portion by calculation. The calculation may use the electrical quantity information measured between the pair of electrodes. The calculation may also use the orientation information received from the sensor. Using calculation to determine the amount of liquid aerosol-forming substrate held in the liquid storage portion may be advantageous, as the control system may not be required to store or retrieve historical measurement data to perform the determination.

When the liquid storage portion is stationary or moving at a constant velocity, the liquid aerosol-forming substrate held in the liquid storage portion may settle and form a predictable shape. The predictable shape may depend on the shape of the liquid storage portion, the orientation of the liquid storage portion and the volume of liquid aerosol-forming substrate held in the liquid storage portion. The shape of the liquid aerosol-forming substrate in the liquid storage portion may change as the liquid storage portion is moved, rotated or accelerated in any other way. Changes in orientation and general acceleration of the liquid storage portion may affect the electrical quantity measured between the pair of electrodes as the shape of the liquid aerosol-forming substrate in the liquid storage portion changes.

The sensor may be further configured to sense acceleration of the liquid storage portion. The acceleration may comprise at least one of linear acceleration and angular velocity. The control system may be further configured to receive acceleration information from the sensor.

In some embodiments, the sensor comprises one or more accelerometers configured to sense linear acceleration of the liquid storage portion. In some embodiments, the sensor comprises one or more gyroscopes configured to sense angular velocity of the liquid storage portion. In some embodiments, the sensor comprises one or more accelerometers and one or more gyroscopes.

In some embodiments, the sensor is an inertial measurement unit. As used herein, an inertial measurement unit is a sensor that is configured to sense both linear acceleration and angular velocity. Typically, an inertial measurement unit comprises one or more accelerometers and one or more gyroscopes.

Where the control system is configured to receive acceleration information from the sensor, the control system may be configured to determine whether the liquid storage portion is in one of a stable condition and an unstable condition based on the acceleration information. The control system may be configured to determine that the liquid storage portion is in a stable condition when the liquid storage portion is substantially stationary or travelling at a substantially constant velocity. The control system may be configured to determine that the liquid storage portion is in an unstable condition when the liquid storage portion is subjected to acceleration.

In some embodiments, the control system may be configured to compare the received acceleration information to one or more threshold acceleration values. The one or more threshold acceleration values may be stored in a memory of the control system. The control system may be configured to compare the received acceleration information to one or more threshold acceleration values; determine that the liquid storage portion is in the stable condition if the received acceleration information is equal to or below the one or more threshold acceleration values; and determine that the liquid storage portion is in the unstable condition if the received acceleration information is above the one or more acceleration threshold values.

The control system may be configured to determine the amount of liquid aerosol-forming substrate held in the liquid storage portion if the liquid storage portion is determined to be in the stable condition. The control system may also be configured to substantially prevent or inhibit the determination of the amount of liquid aerosol-forming substrate held in the liquid storage portion if the liquid storage portion is determined to be in an unstable condition. Determining the amount of liquid aerosol-forming substrate held in the liquid storage portion only when the liquid storage portion is stationary or travelling at a constant velocity may improve the reliability of the determination of the amount of liquid aerosol-forming substrate held in the liquid storage portion.

In some embodiments, the pair of electrodes may be arranged to sense the surface area of the liquid storage portion that is in contact with liquid aerosol-forming substrate. The control system may be configured to determine the amount of liquid aerosol-forming substrate held in the liquid storage portion based on the surface area of the liquid storage portion that is in contact with the liquid aerosol-forming substrate. The surface area of the liquid storage portion that is in contact with the liquid aerosol-forming substrate may be referred to as the 'wetted' surface area. The wetted surface area of the liquid storage portion may depend on the shape of the liquid aerosol-forming substrate in the liquid storage portion when the liquid storage portion is stationary or moving at a constant velocity. The wetted surface area of the liquid storage portion may remain substantially constant when the liquid storage portion is in a stable condition. However, the wetted surface area of the liquid storage portion may vary under acceleration of the liquid storage portion. Therefore, in these embodiments it may be particularly desirable to measure the electrical quantity between the pair of electrodes when the liquid storage portion is in a stationary or stable condition. In these embodiments, the control system may be configured to determine whether the liquid storage portion is in a stable condition or an unstable condition, determine the amount of liquid aerosol-forming substrate held in the liquid storage portion if the liquid storage portion is determined to be in a stable condition and substantially prevent or inhibit the determination of the amount of liquid aerosol-forming substrate held in the liquid storage portion if the liquid storage portion is determined to be in an unstable condition.

In some embodiments, the aerosol-generating system may comprise aerosol-generating means arranged to receive liquid aerosol-forming substrate from the liquid storage portion. In these embodiments, it is generally desirable for the aerosol-generating means to receive liquid aerosol-forming substrate from the liquid storage portion at a particular rate, such that the aerosol-generating means is consistently wetted by liquid aerosol-forming substrate. Activation of the aerosol-generating means when insufficient liquid aerosol-forming substrate is received by the aerosol-generating means may result in generation of an aerosol-comprising undesirable components or an undesirable increase in temperature of the aerosol-generating means that may damage the aerosol-generating means.

In these embodiments, the control system may be configured to control or modulate operation of the aerosol-generating means based on at least one of the orientation of the liquid storage portion and the amount of liquid aerosol-forming substrate held in the liquid storage portion. This may improve the experience provided by the aerosol-generating means and prolong the life of the aerosol-generating means.

In some embodiments, the system may comprise: aerosol-generating means arranged to receive liquid aerosol-forming substrate from the liquid storage portion; and one or more electrical power sources arranged to supply power to the aerosol-generating means. In these embodiments, the control system may be configured to control or modulate the supply of power from the one or more electrical power sources to the aerosol-generating means based on the orientation information received from the sensor or the determined orientation of the liquid storage portion. In these embodiments, the control system may be configured to control or modulate the supply of power from the one or more electrical power sources to the aerosol-generating means based on the determined amount of liquid aerosol-forming substrate held in the liquid storage portion.

The control system may be configured to reduce the supply of power to the aerosol-generating means as the orientation of the liquid storage portion moves away from a certain orientation, such as an upright orientation. In some embodiments, the control system may be configured to substantially prevent or inhibit the supply of power to the aerosol-generating means if the liquid storage portion is determined to be in one or more certain orientations. The control system may be configured to substantially prevent or inhibit the supply of power to the aerosol-generating means if the liquid storage portion is determined to be in an inverted or upside-down orientation.

The control system may be configured to reduce the supply of power to the aerosol-generating means as the amount on liquid aerosol-forming substrate held in the liquid storage portion reduces. In some embodiments, the control system may be configured to substantially prevent or inhibit the supply of power to the aerosol-generating means if the amount of liquid aerosol-forming substrate held in the liquid storage portion is determined to be below a threshold amount.

The threshold amount may be predetermined (e.g., determined prior to first use). The threshold amount may be set in the factory or before first use. The threshold amount may be any suitable amount. For example, the threshold amount may be between about 1% and about 15% of the liquid storage portion volume, or between about 3% and 10% or about 5%. For example, for a liquid storage portion configured to hold about 2 ml of liquid aerosol-forming substrate, the predetermined or, alternatively, desired threshold amount value may be between about 0.1 ml and about 0.3 ml. The threshold amount may be dependent on the cross-sectional area of the aerosol-generating means and the volume of the liquid storage portion. For example, the aerosol-generating means may be a heater and a heater having a large cross-sectional area may require more liquid aerosol-forming substrate than a heater having a small cross-sectional area in order to operate at the desired temperature. Thus, an aerosol-generating system having a large heater may have a larger minimum threshold amount than an aerosol-generating system having a smaller heater. The threshold amount may be between about 0.1 ml and 10 ml, or between about 0.5 ml and about 5 ml, or about 0.5 ml.

The control system may be configured to disable the aerosol-generating means if the determined amount of liquid aerosol-forming substrate is below an amount threshold. The control system may be configured to reversibly disable the aerosol-generating means. The control system may be configured to enable the aerosol-generating means if the determined amount is above the predetermined or, alternatively, desired threshold amount. The control system may be configured to irreversibly disable the aerosol-generating means. The control system may be configured to damage or break a frangible connection between the aerosol-generating means and a power supply. This may be advantageous for a disposable cartridge of an aerosol-generating system comprising the aerosol-generating means and for a disposable aerosol-generating system.

Acceleration of the liquid storage portion may also affect the supply of liquid aerosol-forming substrate to the aerosol-generating means. Therefore, in some embodiments, the control system may be configured to control or modulate operation of the aerosol-generating means based on acceleration information received from the sensor. The control system may be configured to control or modulate operation of the aerosol-generating means based on the determination of whether the liquid storage portion is in a stable or an unstable condition. This may improve the experience provided by the aerosol-generating means and prolong the life of the aerosol-generating means.

The control system may be configured to control or modulate the supply of power from the one or more electrical power sources to the aerosol-generating means based on acceleration information received from the sensor.

In some embodiments, the control system may be configured to substantially prevent or inhibit operation of the aerosol-generating means if the acceleration information received from the sensor is above an acceleration threshold. The control system may be configured to substantially prevent or inhibit operation of the aerosol-generating means the liquid storage portion is determined to be in an unstable condition.

The liquid storage portion may be any suitable shape and size. For example, the liquid storage portion may have a cross-section that is substantially circular, elliptical, square, rectangular or triangular. The liquid storage portion may be substantially tubular or cylindrical. The liquid storage portion may have a length and a width or a diameter. The length of the liquid storage portion may be greater than the width or the diameter of the liquid storage portion. In other words, the liquid storage portion may be elongate. The liquid storage portion may have a central longitudinal axis. The cross-section of the liquid storage portion may be substantially uniform along the central longitudinal axis. In other words, the shape and size of the cross-section of the liquid storage portion may be substantially constant along the length of the liquid storage portion. The liquid storage portion may have one or more degrees of rotational symmetry about the central longitudinal axis. The liquid storage portion may be annular. The liquid storage portion may be annular and may comprise a central passage. The central passage may extend in the direction of the central longitudinal axis.

The liquid storage portion may comprise a housing or a container configured to hold liquid aerosol-forming substrate. The housing may comprise two opposing ends and at least one sidewall extending between the two opposing ends. The housing may comprise a first end, a second end and one or more sidewalls extending between the first end and the second end. The first end, second end and sidewalls may be integrally formed. The first end, second end and sidewalls may be distinct elements that are attached or secured to each other. The housing may be rigid. As used herein, the term 'rigid housing' is used to mean a container that is self-supporting. The housing may comprise one or more flexible walls. The flexible walls may be configured to adapt to the volume of the liquid aerosol-forming substrate held in the liquid storage portion. The housing may be formed from any suitable material. The housing may be formed from a substantially fluid impermeable material. The housing may comprise a transparent or a translucent portion, such that liquid aerosol-forming substrate held in the liquid storage portion may be visible through the transparent or translucent portion of the container.

The pair of electrodes are arranged adjacent to or in the liquid storage portion. As used herein in the present disclosure, the term 'adjacent to or in' is meant to include terms such as: next to, close to, in close proximity to, on, within and inside. For example, where the liquid storage portion comprises a housing having sidewalls, the pair of electrodes may be considered to be 'adjacent to or in' the liquid storage portion when they are arranged next to or neighboring the sidewalls of the housing, when they abut or contact an outer surface of the sidewalls of the housing, when they are secured to or applied to an outer surface of the sidewalls of the housing, when they are secured to or applied to an inner surface of the sidewalls, when they form an integral part of the sidewalls of the housing and when they are within or inside the housing.

The pair of electrodes may be arranged relative to the liquid storage portion such that the pair of electrodes sense electrical properties of the liquid storage portion. Put in another way, the pair of electrodes may be arranged in electrical proximity to the liquid storage portion. The pair of electrodes may be arranged to sense changes in the electrical properties of the liquid storage portion, which may occur as a result of a change in the amount of liquid aerosol-forming substrate held in the first portion.

In some embodiments, the pair of electrodes may be arranged such that at least a portion of the liquid storage portion is arranged between the electrodes. The pair of electrodes may be arranged at opposite sides of the liquid storage portion. Where the liquid storage portion is an annular liquid storage portion, having a central passage, one of the electrodes may be arranged at an outer side of the liquid storage portion and the other of the electrodes may be arranged at an inner side of the liquid storage portion, adjacent to or in the central passage.

In some embodiments, where the pair of electrodes are arranged with a portion of the liquid storage portion arranged between them, the pair of electrodes may form a capacitor and the portion of the liquid aerosol-forming substrate between the electrodes may form the dielectric of the capacitor. The dielectric properties of the portion of the liquid storage portion between the electrodes may vary with the amount of liquid aerosol-forming substrate held in the portion of the liquid storage.

In some embodiments, the pair of electrodes may be arranged without a portion of the liquid storage portion arranged between the electrodes. The pair of electrodes may be arranged at the same side of the liquid storage portion.

Where the liquid storage portion comprises a housing having sidewalls and the pair of electrodes extend substantially over the sidewalls, the electrodes may be arranged to sense the surface area of the sidewalls that is in contact with the liquid aerosol-forming substrate held in the liquid storage portion. The surface area of the sidewalls of the housing of the liquid storage portion that is in contact with the liquid aerosol-forming substrate may be used to determine the amount of liquid aerosol-forming substrate held in the liquid storage portion.

In some embodiments, the pair of electrodes are interdigitated electrodes. A pair of interdigitated electrodes may form a capacitive sensing system, such as the pair of interdigitated electrodes sense electrical properties of media adjacent to the electrodes using fringing electric field effects. A pair of interdigitated electrodes may be arranged to sense the surface area of the sidewalls that is in contact with the liquid aerosol-forming substrate held in the liquid storage portion.

In some embodiments, the pair of interdigitated electrodes may be arranged on a housing of the liquid storage portion. In some embodiments, the pair of interdigitated electrodes may be arranged on a platform. The pair of interdigitated electrodes may be provided on a surface of a flexible platform that substantially circumscribes the liquid storage portion.

Each electrode of the pair of interdigitated electrodes comprises a plurality of electrically connected projections, protrusions or fingers and gaps or spaces between the fingers. The fingers may be electrically connected by a main track or a spine. The fingers and gaps of each interdigitated electrode may be arranged in a regular or periodic arrangement. A pair of interdigitated electrodes may be arranged on a plane or a surface and the fingers of each of the electrodes may extend into the spaces between the fingers of the other electrode.

The fingers of each interdigitated electrode may have a length, a width and a thickness. The length of the fingers of each interdigitated electrode may be substantially greater than the width and the thickness of the fingers. In other words, the fingers of each interdigitated electrode may be substantially elongate. The fingers of each interdigitated electrode may be substantially linear. The fingers of each interdigitated electrode may extend substantially in one direction. The fingers of each interdigitated electrode may be substantially non-linear. For example, the fingers of each interdigitated electrode may be substantially curved or arcuate.

The fingers of each interdigitated electrode may be substantially identical. The gaps between the fingers of each interdigitated electrode may be substantially identical. The fingers and gaps of each interdigitated electrode may be arranged in a regular arrangement, with a regular spacing or gap between each successive finger. The distance between successive fingers of each interdigitated electrode may be referred to as the spatial wavelength $\lambda$ or band gap of the electrode.

An example of a suitable pair of interdigitated electrodes may be the DRP-G-IDEPT10 sensor from DropSens™.

Where the liquid storage portion comprises a housing having sidewalls and the pair of interdigitated electrodes extend substantially over the sidewalls, the electrodes may be arranged to sense the surface area of the sidewalls that is in contact with the liquid aerosol-forming substrate held in the liquid storage portion.

One of the electrodes of a pair of interdigitated electrodes may be a driving electrode that is supplied with an oscillating voltage. The other electrode may be a sensing electrode that senses the electric fringing field generated by the driving electrode. The electric fringing field generated by the driving electrode comprises an electric fringing field due to the stray electric fields at the edges of the fingers of the driving electrode, which comprises a component that extends out of the plane or surface on which the interdigitated electrodes are arranged, in a direction substantially normal to the plane or surface. As such, the electric fringing field generated by the driving electrode extends into the material arranged above or adjacent to the electrodes. Put in another way, a pair of interdigitated electrodes arranged at a side of the liquid storage portion of at least some example embodiments may apply a spatially periodic electrical potential to the liquid storage portion at that side.

Electrical properties of a material arranged above or adjacent to a pair of interdigitated electrodes may affect the electric fringing field generated by the driving electrode. For example, the permittivity of a material arranged above or adjacent to a pair of interdigitated electrodes may affect the generated electric fringing field. Thus, the sensing electrode of the pair of interdigitated electrodes may sense changes in the electrical properties the material arranged above or adjacent to the pair of interdigitated electrodes.

Electrical shielding may be provided on one side of the pair of interdigitated electrodes, such that the pair of interdigitated electrodes may react to changes in the electrical properties of the material adjacent to one side of the pair of interdigitated electrodes only. Electrical shielding may be provided on the side of the pair of electrodes opposite to or facing away from the liquid storage portion. The electrical shielding may comprise a sheet or mesh of electrically conductive material that extends beneath or over the electrodes. The sheet or mesh of electrically conductive material may be grounded. The sheet or mesh may be electrically connected to a voltage follower that is electrically connected to the interdigitated electrodes. This arrangement may substantially remove any parasitic capacitance caused by the shielding, which may improve the sensitivity of the pair of interdigitated electrodes.

The penetration depth of the electric fringing field generated by the driving electrode into the material arranged above or adjacent to the pair of interdigitated electrodes may be proportional to the distance between adjacent fingers of the driving and sensing electrodes. In other words, the penetration depth of the generated electric fringing field is proportional to the band gap of the interdigitated electrodes ($\lambda$). The penetration depth is independent of the frequency of the oscillating driving signal.

In general, the penetration depth of the generated electric fringing field increases as the band gap $\lambda$ of the interdigitated electrodes increases. Typically it has been found that penetration depth is about one third of the band gap $\lambda$. It may be necessary to achieve a minimum penetration depth into the liquid storage portion in order to effectively sense the presence or absence of liquid aerosol-forming substrate.

A suitable example penetration depth for a generated electric fringing field into the liquid storage portion may be about 1 mm. The electrodes may be arranged at an outer surface of a side wall of the liquid storage portion. The thickness of the side wall may be about 1 mm. In this case, a penetration depth of about 2 mm would be required, which corresponds to a band gap λ of about 6 mm. In other cases, a side wall of the liquid storage portion and a platform on which the electrodes are mounted may be arranged between the electrodes and the liquid storage portion. The combined thickness of the side wall and platform may be about 2 mm. In this case, a penetration depth of 3 mm would be required, which corresponds to a band gap λ of about 9 mm. The band gap λ of the electrodes may be between about 0.5 mm and about 15 mm or between about 1 mm and about 12 mm or between about 2 mm and about 10 mm.

The relatively small penetration depth of the electric fringing field generated by the interdigitated electrodes generally means that interdigitated electrodes adjacent to a liquid storage portion sense the presence or absence of liquid aerosol-forming substrate at the surfaces or walls of the liquid storage portion only. This is different to a pair of electrodes arranged at opposite sides of the liquid storage portion with a portion of the liquid storage portion arranged between them, which sense the average electrical properties of the portion of the liquid storage portion arranged between them. As a result, measurements from interdigitated electrodes arranged adjacent to a liquid storage portion tend to indicate the proportion or fraction of the surface of the liquid storage portion that is wetted with liquid aerosol-forming substrate. The proportion or fraction of the surface of the sidewalls that is covered by liquid aerosol-forming substrate for a given amount of liquid aerosol-forming substrate and a given orientation of the liquid storage portion depends on the shape of the liquid storage portion. In these embodiments, the cross-section of the liquid storage portion may be, for example, uniform along the central longitudinal axis. In particular embodiments, the liquid storage portion may be substantially cylindrical.

In general, the sensitivity of a pair of interdigitated electrodes increases as the number of fingers provided on the interdigitated pair of electrodes increases. Thus, for a given size of liquid storage portion, the smaller the band gap of the electrodes, the greater the number of fingers may be provided on each electrode and the greater the sensitivity of the pair of interdigitated electrodes.

According to one or more example embodiments, interdigitated electrodes may be required to have a band gap that is equal to or above a minimum band gap in order to generate an electric fringing field with a penetration depth that is sufficient to reach into the liquid storage portion. As such, according to one or more example embodiments, the sensitivity of a pair of interdigitated electrodes tends to decrease as the size of the liquid storage portion decreases, as the number of fingers provided on each electrode is reduced rather than the size of the band gap. However, the sensitivity of a pair of electrodes arranged at opposite sides of a liquid storage portion with a portion of the liquid storage portion arranged between the electrodes, may increase as the size of the liquid storage portion decreases. This is because the sensitivity of the electrodes to changes in the electrical properties of the material between the electrodes may increase as the distance between the electrodes decreases. Thus, according to one or more example embodiments, the size of the liquid storage portion may determine the arrangement of electrodes that is most appropriate. In general, a pair of interdigitated electrodes may be more appropriate for systems having larger liquid storage portions and electrodes arranged with portions of the liquid storage portion between the electrodes may be more appropriate for systems having smaller liquid storage portions.

The electrodes of each pair of electrodes are spaced apart or separated from each other. This spacing or separation may prevent direct electrical contact between the electrodes of a pair of electrodes. The spacing, separation or gap between the electrodes may be consistent along the lengths of the electrodes.

For example, the spacing between the pair of electrodes may be between about 0.5 mm and about 3 mm, or between about 0.5 mm and about 2 mm or between about 0.5 mm and about 1.5 mm. Where the pair of electrodes are arranged at opposite sides of the liquid storage portion, the spacing between the electrodes may be about the width of the liquid storage portion or a diameter of the liquid storage portion that is cylindrical. In the case of the cylindrical liquid storage portion, the spacing between the pair of electrodes may be equal to or larger than 5 mm. Where the pair of electrodes are not arranged at opposite sides of the liquid storage portion, the electrodes may be interdigitated electrodes, which may have a smaller spacing between the electrodes. For example, in this case, the spacing between the electrodes of a pair of interdigitated electrodes may be between about 125 μm and about 5 mm, or between about 125 μm and about 2 mm, or between about 125 μm and about 1 mm.

The electrodes may be any suitable type of electrode. For example, suitable types of electrodes include plate electrodes and track electrodes. Each electrode may be the same type of electrode or a different type of electrode.

The electrodes may by any suitable shape. For example, the electrodes may be: square, rectangular, curved, arcuate, annular, spiral or helical. The electrodes may comprise one or more sections that are substantially linear, non-linear, planar or non-planar. The electrodes may be rigid. Rigidity may enable the electrodes to maintain their shape and spacing from each other. The electrodes may be flexible. Flexibility may enable the electrodes to conform to the shape of the liquid storage portion. The electrodes may be configured to conform to the shape of a housing of the liquid storage portion.

The electrodes may have a length, a width and a thickness. The length of the electrodes may be substantially greater than the width of the electrodes. In other words, the electrodes may be elongate. The thickness of the electrodes may be substantially less than the length and the width of the electrodes. In other words, the electrodes may be thin. Thin electrodes and elongate electrodes may have a large surface area to volume ratio, which may improve the sensitivity of electrical quantity measurements.

The electrodes may comprise any suitable material. The electrodes may comprise any suitable electrically conductive material. Suitable electrically conductive materials include metals, alloys, electrically conductive ceramics and electrically conductive polymers. As used herein in the present disclosure, an electrically conductive material refers to a material having a volume resistivity at 20° C. of less than about $1\times10^{-5}$ Ωm, typically between about $1\times10^{-5}$ Ωm and about $1\times10^{-9}$ Ωm. The electrically conductive materials may particularly include at least one of copper, gold and platinum. The electrically conductive materials may include conductive inks when the electrodes are printed on the liquid storage portion. Suitable conductive inks may include silver to provide electrical conductivity. The electrodes may be coated with a passivation layer. The electrodes may comprise or be coated in material that is sufficiently non-reactive so as not to react with or contaminate the liquid aerosol-forming substrate. The electrodes may comprised transparent or translucent material. For example, a suitable transparent material may be Indium Tin Oxide (ITO).

The pair of electrodes may extend substantially the length of the liquid storage portion. The pair of electrodes may be arranged at a side of the liquid storage portion. The pair of electrodes may be arranged at two or more sides of the liquid storage portion. The pair of electrodes may substantially circumscribe the liquid storage portion. The pair of electrodes may substantially surround the liquid storage portion. Where the pair of electrodes substantially circumscribes the liquid storage portion and extend substantially the length of the liquid storage portion, the pair of electrodes may form a tubular sleeve that substantially surrounds the liquid storage portion.

At least one of the pair of electrodes may be arranged in the liquid storage portion. At least one of the pair of electrodes may be arranged in direct contact with liquid aerosol-forming substrate held in the liquid storage portion. Where a carrier material is provided in the liquid-storage portion, at least one of the pair of electrodes may be arranged in contact with the carrier material. Where an electrode is arranged inside the liquid storage portion or at any position in which the electrode is likely to encounter liquid or moisture, the electrode may be protected or shielded from the liquid or moisture, such as by a coating of a hydrophobic material.

Where the liquid storage portion comprises a housing for holding the liquid storage portion, one or more of the electrodes may be arranged at or on the housing. One or more of the electrodes may be provided on an outer surface of the housing. One or more of the electrodes may be provided on an inner surface of the housing. The electrodes may form an integral part of the housing.

The pair of electrodes may extend over a portion of the housing. Where the liquid storage portion comprises a housing comprising two opposing ends and at least one sidewall extending between the opposing ends, the pair of electrodes may extend over a portion of the one or more sidewalls. The pair of electrodes may extend substantially over the one or more sidewalls. The pair of electrodes may extend over the entirety of the one or more sidewalls.

At least one of the pair of electrodes may be arranged on a platform. Each electrode may be arranged on a separate platform. The pair of electrodes may be arranged on the same platform. The one or more platforms may be arranged at one or more of the sides of the liquid storage portion. The one or more platforms may substantially circumscribe the liquid storage portion. Where the liquid storage portion comprises a housing, the one or more platforms may be provided at or on the housing. The one or more platforms may be arranged at one or more of the sides of the housing. The one or more platforms may substantially circumscribe the housing. The one or more platforms may be separate from the housing. The one or more platforms may be secured to the housing. The one or more platforms may be integrally formed with the housing. The one or more platforms may comprise the same material as the housing. The one or more platforms may comprise a different material to the housing.

The one or more platforms may be rigid. The one or more platforms may be flexible. The one or more flexible platforms may be bent around two or more sides of the liquid storage portion. The one or more flexible platforms may substantially circumscribe the liquid storage portion.

The one or more platforms may be formed of electrically insulating material. The one or more platforms may comprise any suitable electrically insulating material. For example, suitable electrically insulating materials include glasses, plastics and ceramic materials. Particularly suitable materials include polyimide and polyester. As used herein in the present disclosure, an electrically insulating material refers to a material having a volume resistivity at 20° C. of greater than about $1\times10^6$ Ωm, typically between about $1\times10^9$ Ωm and about $1\times10^{21}$ Ωm.

In some embodiments, the one or more platforms may be made from a hydrophobic material. The platform may be coated with a hydrophobic coating.

The one or more platforms may be printed circuit boards. The pair of electrodes may comprise conductive tracks printed on a surface of the one or more printed circuit boards. The one or more printed circuit boards may be flexible printed circuit boards.

The electrodes may be applied to a surface of the housing of the liquid storage portion or a platform. The electrodes may be applied to a surface of the housing or a platform by any suitable means of application, such as by printing, coating and spraying. The electrodes may be secured to a surface of the housing or a platform. The electrodes may be secured to a surface of the housing or a platforms by any suitable means, such as by an adhesive. The electrodes may be etched in a platform, a circuit board or a housing of the liquid storage portion.

The aerosol-generating system may be provided with more than one pair of electrodes. In these embodiments, the control system may be configured to measure an electrical quantity between each pair of electrodes and determine the orientation of the liquid storage portion based on electrical quantity information measured between the pairs of electrodes.

The sensor may be any suitable type of sensor. The sensor may be configured to sense the orientation of the liquid storage portion. The sensor may further be configured to sense acceleration of the liquid storage portion in one or more directions. The sensor may be configured to sense at least one of linear acceleration and angular velocity of the liquid storage portion.

The sensor may comprise one or more accelerometers configured to sense linear acceleration of the liquid storage portion. The sensed linear acceleration may provide an indication of the orientation of the liquid storage portion. The sensor may comprise one or more gyroscopes configured to sense angular velocity of the liquid storage portion. The sensed angular velocity may provide an indication of the orientation of the liquid storage portion. The one or more gyroscopes may also be configured to sense the orientation of the liquid storage portion. One or more gyroscopes may provide an improved indication of the orientation of the liquid storage portion compared to one or more accelerometers. The sensor may comprise a combination of one or more accelerometers and one or more gyroscopes. The sensor may comprise any suitable number of accelerometers and gyroscopes. A combination of accelerometers and gyroscopes, providing a combination of sensed linear acceleration information and sensed angular velocity information to the control system, may improve the reliability of the indication of the orientation of the liquid storage portion compared to a sensor comprising either accelerometers or gyroscopes alone.

In some embodiments, the sensor is an inertial measurement unit. The inertial measurement unit may be a MEMs sensor. The inertial measurement unit may comprise a 3-axis accelerometer and one or more gyroscopes. This configuration may enable the inertial measurement unit to measure linear acceleration along three perpendicular axes and angular rotation about the three axes. The inertial measurement unit may further comprise a magnetometer, such as a tripleaxis magnetometer, to provide further orientation information based on the magnetic pole of the earth The inertial measurement unit may be a micro-machined, integrated inertial module with tri-axial gyroscope and accelerometer. For example, a suitable inertial measurement unit may be the SD746 device, available from SensorDynamics AG.

The sensor may be arranged at any suitable position in the aerosol-generating system. The sensor may be arranged at any suitable position relative to the liquid storage portion. Where the liquid storage portion has a longitudinal axis, the sensor may be aligned with the longitudinal axis of the liquid storage portion. The sensor may be arranged on the longitudinal axis of the liquid storage portion.

The control system may comprise electric circuitry. The electric circuitry may comprise a microprocessor, which may be a programmable microprocessor. The electric circuitry may comprise further electronic components. The electric circuitry may comprise a printed circuit board on which further electronic components are mounted. The sensor may be arranged on the printed circuit board. The electric circuitry may comprise an analogue-to-digital converter between the sensor and the microprocessor.

The control system may be configured to control or regulate a voltage applied to the pair of electrodes. The control system may be configured to control or regulate a voltage applied to the sensor. In some embodiments, the aerosol-generating system comprises aerosol-generating means and the control system may be configured to control or regulate a supply of power to the aerosol-generating means.

The control system may be configured to apply a voltage to at least one of the pair of electrodes and the sensor following activation of the system. The control system may be configured to apply a voltage to at least one of the pair of electrodes and the sensor intermittently, such as on a puff-by-puff basis.

The control system may be configured to apply a continuous voltage to the pair of electrodes. The control system may be configured to apply a continuous voltage to the sensor. The control system may be configured to apply a voltage to the pair of electrodes in the form of pulses of electrical current. The control system may be configured to apply a voltage to the sensor in the form of pulses of electrical current.

The control system may be configured to supply an oscillating measurement signal to the pair of electrodes. In other words, the control system may be configured to apply an alternating voltage to the pair of electrodes. The control system may be configured to supply an oscillating measurement signal to the pair of electrodes at a predetermined or, alternatively, desired frequency. The predetermined or, alternatively, desired frequency may be any suitable frequency for the control system to measure the electrical quantity between the pair of electrodes. The predetermined or, alternatively, desired frequency may be equal to or less than about 20 MHz, or equal to or less than about 10 MHz. The predetermined or, alternatively, desired frequency may be between about 1 kHz and about 10 MHz, or between about 10 kHz and about 1 MHz, or between about 100 kHz and about 1 MHz.

Liquid aerosol-forming substrates may comprise different compositions with different electrical properties. The control system may be configured to identify the liquid aerosol-forming substrate held storage portion based on electrical quantity information measured between the pair of electrodes. The control system may be configured to adjust the determination of the amount of liquid aerosol-forming substrate held in the liquid storage portion based on the determined identity. In other words, the control system may be configured to compensate for the composition of the liquid aerosol-forming substrate held in the liquid storage portion.

The control system may comprise any suitable means for measuring the electrical quantity between the pair of electrodes. Suitable means include: one or more RC integrators, one or more bridge circuits, one or more oscillators and one or more switched capacitor circuits which make use of amplifiers. These switched capacitor circuits may be configured in amplifying or integrating modes.

The electrical quantity to be measured between the pair of electrodes may be any suitable electrical quantity. For example, the electrical quantity to be measured may be one or more of voltage, current, impedance, resistance and capacitance. In particular embodiments, the electrical quantity to be measured may be capacitance.

The electrical quantity to be measured by the control system may be capacitance. The variation in capacitance may be particularly pronounced where the liquid aerosol-forming substrate comprises dielectric materials.

The capacitance between the pair of electrodes may depend on the amount of liquid aerosol-forming substrate held in the liquid storage portion.

For example, the pair of electrodes may form a capacitor and the liquid storage portion may form the dielectric of the capacitor. The liquid storage portion may comprise a capacitive load and the permittivity of the liquid storage portion may depend on the amount of liquid aerosol-forming substrate held in the liquid storage portion. The capacitance between the pair of electrodes may decrease as the amount of liquid aerosol-forming substrate held in the liquid storage portion decreases. The capacitive load of the liquid storage portion may have a capacitance in the picofarad (pF) range. This may enable fast charging and discharging times of the capacitor, and enable fast measurements of the capacitance.

The capacitance may be measured. For example, the control system may comprise means for measuring charge and discharge times of the capacitor formed by the pair of electrodes. The control system may comprise a timer circuit, such as a 555 timer circuit or any electronic circuit whose oscillating frequency depends on a capacitance, and may be configured to determine capacitance based on the frequency of the timer circuit output.

The capacitance may be calculated. For example, the capacitance may be calculated from measurements of the magnitude of the voltage and the current and the phase difference between the voltage and the current. The capacitance may be calculated from measurements of the impedance. The amount of liquid aerosol-forming substrate held in the liquid storage portion may be calculated from the measured or calculated capacitance.

The amount of liquid aerosol-forming substrate held in the liquid storage portion may be determined from the measured or calculated capacitance.

The liquid storage portion may comprise aerosol-forming substrate held in the liquid storage portion. As used herein in the present disclosure, an aerosol-forming substrate is a substrate capable of releasing volatile compounds that can form an aerosol. Volatile compounds may be released by heating the aerosol-forming substrate. Volatile compounds may be released by moving the aerosol-forming substrate through passages of a vibratable element.

The aerosol-forming substrate may be liquid. The aerosol-forming substrate may be liquid at room temperature. The aerosol-forming substrate may comprise both liquid and solid components. The liquid aerosol-forming substrate may comprise nicotine. The nicotine containing liquid aerosol-forming substrate may be a nicotine salt matrix. The liquid aerosol-forming substrate may comprise plant-based material. The liquid aerosol-forming substrate may comprise tobacco. The liquid aerosol-forming substrate may comprise a tobacco-containing material containing volatile tobacco flavor compounds, which are released from the aerosol-forming substrate upon heating. The liquid aerosol-forming substrate may comprise homogenized tobacco material. The liquid aerosol-forming substrate may comprise a non-tobacco-containing material. The liquid aerosol-forming substrate may comprise homogenized plant-based material.

The liquid aerosol-forming substrate may comprise one or more aerosol-formers. An aerosol-former is any suitable known compound or mixture of compounds that, in use, facilitates formation of a dense and stable aerosol and that is substantially resistant to thermal degradation at the temperature of operation of the system. Examples of suitable aerosol formers include glycerine and propylene glycol. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. The liquid aerosol-forming substrate may comprise water, solvents, ethanol, plant extracts and natural or artificial flavors.

The liquid aerosol-forming substrate may comprise nicotine and at least one aerosol former. The aerosol former may be glycerine or propylene glycol. The aerosol former may comprise both glycerine and propylene glycol. The liquid aerosol-forming substrate may have a nicotine concentration of between about 0.5% and about 10%, for example about 2%.

The liquid aerosol-forming substrate may contain a mixture of dielectric materials, each with a separate dielectric constant ($\varepsilon_r$). The main constituents of a liquid aerosol-forming substrate at room temperature, about 20° C., may include: glycerine ($\varepsilon_r$~42), propylene glycol ($\varepsilon_r$~32), water ($\varepsilon_r$~80), air ($\varepsilon_r$~1), nicotine and flavourants. Where the liquid aerosol-forming substrate forms a dielectric material, the electrical quantity to be measured by the control system may be capacitance.

The liquid storage portion may comprise a carrier material for holding the liquid aerosol-forming substrate. Where the liquid storage portion comprises a housing, the carrier material may be arranged within the housing. The liquid aerosol-forming substrate may be adsorbed or otherwise loaded onto the carrier material. The carrier material may be made from any suitable absorbent body of material, for example, a foamed metal or plastics material, polypropylene, terylene, nylon fibers or ceramic. The aerosol-forming substrate may be retained in the carrier material prior to use of the aerosol-generating system. The aerosol-forming substrate may be released into the carrier material during use. For example, the liquid aerosol-forming substrate may be provided in a capsule.

The aerosol-generating system may comprise aerosol-generating means configured to generate a dispersion (e.g., an atomized cloud or mist or, alternatively, a vapor) from a pre-dispersion formulation (e.g., an aerosol-forming substrate). The aerosol-generating means may be arranged to receive aerosol-forming substrate from the liquid storage portion. The aerosol-generating means may be an atomizer. The aerosol-generating means may be configured to atomize or vaporize received aerosol-forming substrate using heat. The aerosol-generating means may be or include a heating means (e.g., a heater including, for example, a heating coil or heating mesh) for atomizing or vaporizing received pre-dispersion formulation (e.g., a received liquid aerosol-forming substrate or pre-vapor formulation). The aerosol-generating means may be configured to atomize received aerosol-forming substrate (e.g., a received pre-dispersion formulation) using ultrasonic vibrations. For example, the aerosol-generating means may be or include an atomizer including, for example, an ultrasonic transducer.

The aerosol-generating means may comprise one or more aerosol-generating elements. The one or more aerosol-generating elements may be heating elements. The one or more aerosol-generating elements may comprise one or more vibratable elements.

The aerosol-generating means may comprise heating means configured to heat the aerosol-forming substrate. The heating means may be any suitable heating means. The heating means may comprise one or more heating elements. The one or more heating elements may be arranged to heat the aerosol-forming substrate primarily by means of conduction. The one or more heating elements may be arranged substantially in direct contact with the aerosol-forming substrate. The one or more heating elements may be arranged to transfer heat to the aerosol-forming substrate via one or more heat conductive elements. The one or more heating elements may be arranged to transfer heat to ambient air drawn through the aerosol-generating system during use, which may heat the aerosol-forming substrate by convection. The one or more heating elements may be arranged to heat the ambient air before it is drawn through the aerosol-forming substrate. The one or more heating elements may be arranged to heat the ambient air after it is drawn through the aerosol-forming substrate.

The heating means may be electric heating means or an electric heater. The electric heater may comprise one or more electric heating elements. The one or more electric heating elements may comprise an electrically resistive material. Suitable electrically resistive materials may include: semiconductors such as doped ceramics, electrically "conductive" ceramics (such as, for example, molybdenum disilicide), carbon, graphite, metals, metal alloys and composite materials made of a ceramic material and a metallic material. The one or more electric heating elements may take any suitable form. For example, the one or more electric heating elements may take the form of one or more heating blades, one or more heating needles or rods, one or more heating wires or filaments. The one or more heating elements may comprise one or more flexible sheets of material. The one or more heating elements may be deposited in or on a rigid carrier material.

The heating means may comprise inductive heating means. Inductive heating means are described in more detail below, in relation to the cartridge. The heating means may comprise one or more heat sinks or heat reservoirs. The heating means may comprise means for heating a small amount of liquid aerosol-forming substrate at a time.

The aerosol-generating means may comprise one or more vibratable elements and one or more actuators arranged to excite vibrations in the one or more vibratable elements. The one or more vibratable elements may comprise a plurality of passages through which aerosol-forming substrate may pass and become atomized. The one or more actuators may comprise one or more piezoelectric transducers.

The aerosol-generating means may comprise one or more capillary wicks for conveying liquid aerosol-forming substrate held in the liquid storage portion to the one or more elements of the aerosol-generating means. The liquid aerosol-forming substrate may have physical properties, including viscosity, which allow the liquid to be transported through the one or more capillary wicks by capillary action.

The aerosol-generating means may comprise one or more heating wires or filaments encircling a portion of one or more capillary wicks. The heating wire or filament may support the encircled portion of the one or more capillary wicks. The capillary properties of the one or more capillary wicks, combined with the properties of the liquid substrate, may ensure that, during normal use when there is sufficient aerosol-forming substrate, the wick is always wet with liquid aerosol-forming substrate in the area of the aerosol-generating means. When the one or more capillary wicks are dry, the one or more capillary wicks may not deliver a regular supply of liquid aerosol-forming substrate to the aerosol-generating means.

The aerosol-generating system may comprise a power supply. The aerosol-generating system may comprise a power supply arranged to supply power to at least one of the control system, the pair of electrodes and the aerosol-generating means. The aerosol-generating means may comprise an independent power supply. The aerosol-generating system may comprise a first power supply arranged to supply power to the control system and the pair of electrodes and a second power supply configured to supply power to the aerosol-generating means.

The power supply may be a DC power supply. The power supply may be a battery. The battery may be a Lithium based battery, for example a Lithium-Cobalt, a Lithium-Iron-Phosphate, a Lithium Titanate or a Lithium-Polymer battery. The battery may be a Nickel-metal hydride battery or a Nickel cadmium battery. The power supply may be another form of charge storage device such as a capacitor. The power supply may require recharging and be configured for many cycles of charge and discharge. The power supply may have a capacity that allows for the storage of enough energy for one or more experiences; for example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined or, alternatively, desired number of puffs or discrete activations of the heating means and actuator.

The aerosol-generating system may comprise a control system configured to operate the aerosol-generating means. The control system configured to operate the aerosol-generating means may be the control system configured to determine the orientation of the liquid storage portion.

The aerosol-generating system may comprise a temperature sensor in communication with the control system. The temperature sensor may be adjacent to the liquid storage portion. The temperature sensor may be in thermal proximity to the liquid storage portion. The temperature sensor may be a thermocouple. At least one element of the aerosol-generating means may be used by the control system to provide information relating to the temperature. The temperature dependent resistive properties of the at least one element may be known and used to determine the temperature of the at least one element in a manner known to the skilled person. The control system may be configured to account for the effect of temperature on the electrical load of the liquid storage portion using measurements of temperature from the temperature sensor. For example, where the portion of the liquid storage portion arranged between the pair of electrodes comprises a capacitive load, the control system may be configured to account for variations in the dielectric properties of liquid aerosol-forming substrate held in the liquid storage portion due to changes in temperature.

The aerosol-generating system may comprise a puff detector in communication with the control system. The puff detector may be configured to detect when a draw is performed on the mouthpiece. In some embodiments, the pair of electrodes may be used as the puff detector.

The aerosol-generating system may comprise input, such as a switch or button. The input may enable the system to be turned on and off.

The aerosol-generating system may comprise indication means for indicating the determined orientation of the liquid aerosol-forming substrate. The control system may be configured to activate the indication means when the orientation of the liquid storage portion is determined to be suitable for a puff of the aerosol-generating system. The control system may be configured to activate the indication means when the orientation of the liquid storage portion is determined to be suitable for a determination of the amount of liquid aerosol-forming substrate held in the liquid storage portion to be made, for example, when the orientation information received from the sensor matches stored reference orientation information.

The aerosol-generating system may also comprise indication means for indicating the determined amount of liquid aerosol-forming substrate held in the liquid storage portion. The control system may be configured to activate the indication means after a determination of the amount of liquid aerosol-forming substrate held in the liquid storage portion has been made.

The indication means may comprise one or more of lights, such as light emitting diodes (LEDs), a display, such as an LCD display and audible indication means, such as a loudspeaker or buzzer and vibrating means. The control system may be configured to light one or more of the lights, display at least one of an orientation and an amount on the display, emit sounds via the loudspeaker or buzzer and vibrate the vibrating means.

The aerosol-generating system may comprise a housing. The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. The material may be light and non-brittle.

The housing may comprise a cavity for receiving the liquid storage portion. In some embodiments, the housing may comprise a cavity for receiving a cartridge comprising the liquid storage portion, as described in more detail later on. The housing may comprise a cavity for receiving the power supply. The housing may comprise a mouthpiece. The mouthpiece may comprise at least one air inlet and at least one air outlet.

The aerosol-generating system may be portable. The aerosol-generating system may have a size comparable to a conventional cigar or cigarette. The aerosol-generating system may have a total length between about 30 mm and about 150 mm. The aerosol-generating system may have an external diameter between about 5 mm and about 30 mm.

The aerosol-generating system may comprise a main unit and a cartridge. The main unit may comprise the control system. The cartridge may comprise the liquid storage portion for holding the liquid aerosol-forming substrate. The main unit may be configured to removably receive the cartridge. In some embodiments, the aerosol-generating system may comprise a cartridge comprising the liquid storage portion and a main unit comprising the control system and a cavity for receiving the cartridge. In some embodiments, the pair of electrodes may be arranged in the cartridge. In some embodiments, the pair of electrodes may be arranged in the cavity of the main unit.

Where the pair of electrodes are arranged in the cavity of the main unit, the pair of electrodes may be arranged such that the liquid storage portion of the cartridge is arranged adjacent to the pair of electrodes when the cartridge is received in the cavity.

In some embodiments, the main unit may comprise the aerosol-generating means. In other embodiments, the cartridge may comprise the aerosol-generating means. Where the cartridge comprises the aerosol-generating means, the cartridge may be referred to as a 'cartomiser'. In other embodiments, the aerosol-generating system may comprise an aerosol-generating component comprising the aerosol-generating means. The aerosol-generating component may be a separate component from the main unit and the cartridge. The aerosol-generating component may be removably receivable by at least one of the main unit and the cartridge.

The main unit may comprise the one or more power supplies.

Where the cartridge comprises one or more of the pair of electrodes, the control system may be configured to identify or authenticate the cartridge. In other words, the control system may be configured to determine the presence or absence of the one or more electrodes on the cartridge, which may be used to verify whether the cartridge received by the main unit is a genuine or authentic cartridge from the manufacturer of the main unit. Measurements between the pair of electrodes may also be used to identify or authenticate a cartridge received by the main unit. The control system may be configured to determine whether a cartridge has been correctly received by the main unit based on the presence or absence of one or more electrodes on the cartridge or from electrical quantity information measured between the pair of electrodes.

The main unit and the cartridge may comprise inductive heating means. The main unit may comprise an inductor coil and a power supply configured to provide high frequency oscillating current to the inductor coil. The cartridge may comprise a susceptor element positioned to heat the aerosol-forming substrate. As used herein, a high frequency oscillating current means an oscillating current having a frequency of between 10 kHz and 20 MHz. Inductive heating means may enable the system to require no electrical contacts between the cartridge and main unit.

The cartridge may be removably coupled to the main unit. As used herein, the term 'removably coupled' is used to mean that the cartridge and the main unit can be coupled and uncoupled from one another without significantly damaging either the main unit or the cartridge. The cartridge may be removable from the cavity of the main unit when the aerosol-forming substrate has been consumed. The cartridge may be disposable. The cartridge may be reusable and the cartridge may be refillable with liquid aerosol-forming substrate. Cartridges may be replaceable in the cavity of the main unit. The main unit may be reusable.

The cartridge may have a housing or a housing within which a liquid aerosol-forming substrate is held. The housing may be rigid. The housing may be formed from a material that is impermeable to liquid. The cartridge or the housing may comprise a lid. The lid may be peelable (i.e., capable of being peeled) before coupling of the cartridge to the main unit. The lid may be piercable (i.e., capable of being pierced). The main unit may comprise a piercing element for piercing the lid of the cartridge when the cartridge is coupled to the main unit.

The main unit may comprise a mouthpiece. The mouthpiece may comprise at least one air inlet and at least one air outlet. The mouthpiece may comprise more than one air inlet. The mouthpiece may comprise the piercing element.

In a second aspect of one or more example embodiments, there is provided a main unit for an aerosol-generating system according to the first aspect of one or more example embodiments. The main unit comprises: a cavity for receiving a cartridge comprising the liquid storage portion; and the control system. The main unit may further comprise the sensor. The main unit may further comprise the pair of electrodes arranged at the cavity such that the electrodes are adjacent to the liquid storage portion of the cartridge when the cartridge is received in the cavity.

In a third aspect of one or more example embodiments, there is provided a control system for an aerosol-generating system according to the first aspect of one or more example embodiments. The control system is configured to: measure an electrical quantity between a pair of electrodes arranged adjacent to or in a liquid storage portion of the aerosol-generating system; receive orientation information from a sensor; and determine an amount of liquid held in the liquid storage portion based on electrical quantity information measured between the pair of electrodes and the orientation information received from the sensor.

In a fourth aspect of one or more example embodiments, there is provided a method of determining the amount of liquid aerosol-forming substrate held in a liquid storage portion of an aerosol-generating system according to the first aspect of one or more example embodiments, the method comprising: measuring an electrical quantity between a pair of electrodes arranged adjacent to or in a liquid storage portion of the aerosol-generating system; receiving orientation information from a sensor; and determining an amount of liquid held in the liquid storage portion based on electrical quantity information measured between the pair of electrodes and the orientation information received from the sensor.

In a fifth aspect of one or more example embodiments, there is provided a method of operating an aerosol-generating system according to the first aspect of one or more example embodiments, the method comprising: measuring an electrical quantity between a pair of electrodes arranged adjacent to or in a liquid storage portion of the aerosol-generating system; receiving orientation information from a sensor; and controlling a supply of power to aerosol-generating means based on the measured electrical quantity and the received orientation information.

In some embodiments, the received orientation information may be compared to one or more threshold orientation values and the supply of power to the aerosol-generating means may be reduced or prevented or inhibited if the orientation information is greater than the one or more threshold orientation values.

In some embodiments, the measured electrical quantity may be compared to one or more threshold electrical quantity values and the supply of power to the aerosol-generating means may be reduced or prevented or inhibited if the measured electrical quantity is one of greater than or less than the one or more threshold electrical quantity values.

In some embodiments, the method may further comprise determining an amount of liquid held in the liquid storage portion based on electrical quantity information measured between the pair of electrodes and the orientation information received from the sensor. The controlling the supply of power to the aerosol-generating means may be based on the determined amount.

In some embodiments, the determined amount may be compared to one or more threshold amount values and the supply of power to the aerosol-generating means may be reduced or prevented or inhibited if the determined amount is less than the one or more threshold amount values.

In some embodiments, the method may further comprise receiving acceleration information from the sensor. The controlling the supply of power to the aerosol-generating means may be based on the acceleration information.

In some embodiments, the received acceleration information may be compared to one or more threshold acceleration values. In some embodiments, the amount of liquid held in the liquid storage portion may be determined if the received acceleration information is less than the one or more threshold acceleration values.

It will be appreciated that features described in relation to one aspect of one or more example embodiments may also be applicable to other aspects of one or more example embodiments. In particular, features described in relation to the aerosol-generating system may be applicable to the main unit, the cartridge, the control system and the methods and vice versa.

FIG. 1 is a schematic illustration of an example of an aerosol-generating system. FIG. 1 is schematic in nature, and the components shown are not necessarily to scale either individually or relative to one another. The aerosol-generating system comprises a main unit 100, which may be, for example, reusable, in cooperation with a cartridge 200, which may be, for example, disposable. The aerosol-generating system shown in FIG. 1 is an electrically operated smoking system.

The main unit 100 comprises a housing 101. The housing 101 is substantially circularly cylindrical and has a longitudinal length of about 100 mm and an external diameter of about 20 mm, comparable to a conventional cigar.

The main unit 100 comprises an electric power supply in the form of a lithium ion phosphate battery 102 and a control system in the form of control electronics 104, which are housed within the housing 101. The control electronics 104 comprise a puff sensor 106, in the form of a microphone, an LED 108, which is activated to indicate that the main unit is activated, and a sensor in the form of an inertial measurement unit 110 in accordance with at least some example embodiments, which will be described in more detail below.

The housing 101 of the main unit 100 also defines a cavity 112 into which the cartridge 200 is received.

The main unit 100 further includes a mouthpiece portion 120 including an outlet 124. In at least this example embodiment, the mouthpiece portion 120 is connected to the housing 101 of the main unit 100 by a hinged connection. However, it will be appreciated that any kind of connection, such as a snap fitting or a screw fitting, may be used to connect the mouthpiece portion 120 to the housing 101 of the main unit 100. One or more air inlets 122 are provided between the mouthpiece portion 120 and the main body 101 when the mouthpiece portion is in a closed position, as shown in FIG. 1.

A flat spiral inductor coil 111 is provided within the mouthpiece portion 120. The coil 111 is formed by stamping or cutting a spiral coil from a sheet of copper. The coil 111 is positioned between the air inlets 122 and the air outlet 124 so that air drawn through the inlets 122 to the outlet 124 passes through the coil.

Figure 2:
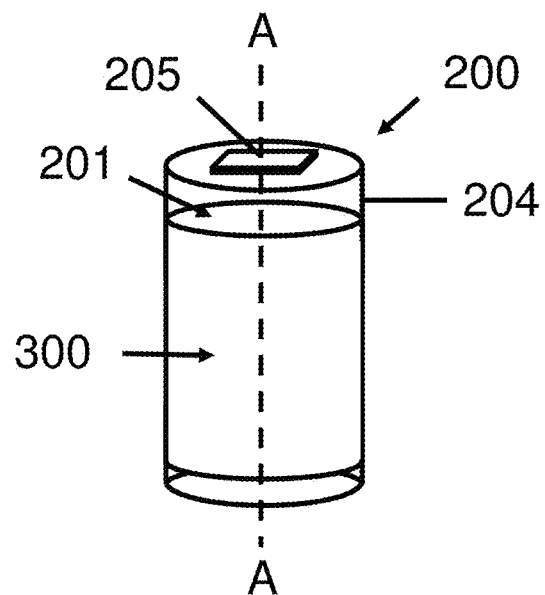
FIG. 2 shows a perspective view of a cartridge according to an embodiment of at least some example embodiments that is suitable for use in the dispersion-generating system of FIG. 1.

The cartridge 200, which is shown in schematic form in FIGS. 1 and 2, comprises a rigid housing 204 defining a liquid storage portion 201. The liquid storage portion 201 contains a liquid aerosol-forming substrate (not shown). The housing 204 of the cartridge 200 is fluid impermeable but has an open end covered by a permeable susceptor element 205. The permeable susceptor element 205 comprises a ferrite mesh, comprising a ferrite steel. The aerosol-forming substrate can form a meniscus in the interstices of the mesh. When the cartridge 200 is received in the cavity 112 and engaged with the main unit, the susceptor element 205 is positioned adjacent the flat spiral coil 111. The cartridge 200 may include keying features (not shown) to ensure that it cannot be inserted into the main unit upside-down.

In use, a puff on the mouthpiece portion 120 includes drawing air though the air inlets 122 in the housing 101, into the mouthpiece portion 120 and out of the outlet 124. A small air flow is drawn through a sensor inlet 121 in the housing 101, past the microphone 106 and up into the mouthpiece portion 120 when a puff is performed on the mouthpiece portion. When a puff is detected, the control electronics 104 provide a high frequency oscillating current to the coil 111. This generates an oscillating magnetic field as shown in dotted lines in FIG. 1. The oscillating magnetic field passes through the susceptor element 205, inducing eddy currents in the susceptor element 205. The susceptor element 205 heats up as a result of Joule heating and as a result of hysteresis losses, reaching a temperature sufficient to vaporize the aerosol-forming substrate close to the susceptor element. The vaporized aerosol-forming substrate is entrained in the air flowing from the air inlets to the air outlet and cools to form an aerosol within the mouthpiece portion before exiting the mouthpiece portion. The control electronics 104 supply the oscillating current to the coil for a predetermined or, alternatively, desired duration, in this example five seconds, after detection of a puff and then switches the current off until a new puff is detected.

The cartridge 200 has a circularly cylindrical shape and the susceptor element 205 spans a circular open end of the cartridge housing 204. It will be appreciated that other configurations are possible. For example, the susceptor element may be a strip of steel mesh 205 that spans a rectangular opening in the cartridge housing.

The example aerosol-generating system shown in FIG. 1 relies on inductive heating. Further examples of suitable inductive heating elements and explanation of the operation of inductive heating systems are described in WO 2015/177046 A1.

It will be appreciated that other aerosol-generating systems according to at least some example embodiments may comprise other types of aerosol-generating means. For example, the aerosol-generating means may comprise other aerosol-generating means configured to atomise the liquid aerosol-forming substrate by heat. The aerosol-generating means may comprise one or more resistive heating elements. The aerosol-generating means may also comprise aerosol-generating means configured to atomise the liquid aerosol-forming substrate by vibration. The aerosol-generating means may comprise one or more vibratable elements and actuators.

FIG. 2 shows the cartridge 200 removed from the main unit 100. The cartridge 200 has a housing 204 in the form of a circularly cylindrical housing defining a liquid storage portion 201 for holding liquid aerosol-forming substrate.

The housing 204 comprises a first end, a second end opposite the first end and having a susceptor 205, and a tubular sidewall extending between the first and second ends. The housing 204 has full rotational symmetry about a central longitudinal axis A-A.

It will be appreciated that according to at least some other example embodiments, the cartridge may not be provided with a susceptor. The cartridge may instead be provided with another suitable type of aerosol-generating means. For example, the cartridge may be provided with a resistive heater that may be physically and electrically connected to the power supply of the main unit via electrical contacts on the cartridge and complimentary electrical contacts in the cavity of the main unit. The electrical contacts of the cartridge may come into contact with the electrical contacts of the main unit when the cartridge is received in the cavity of the main unit. According to at least some other example embodiments, the main unit may comprise the aerosol-generating means and the cartridge may not comprise any part of the aerosol-generating means.

It will also be appreciated that according to at least some other example embodiments, the cartridge may have a housing forming any other suitable shape, such as a rectangular cuboid.

An interdigitated sensor 300 circumscribes the circularly cylindrical housing 204. In other words, a sensor comprising a pair of electrodes 320 circumscribes the circularly cylindrical housing 204. The interdigitated sensor 300 extends the length of the housing 204, substantially covering the tubular sidewall. The interdigitated sensor 300 forms a circularly cylindrical sleeve that substantially surrounds the sidewall of housing 204.

The interdigitated sensor 300 is shown in more detail in FIGS. 3 to 6. The interdigitated sensor 300 comprises a flexible printed circuit board 310, a pair of electrodes 320 and shielding 330.

The flexible printed circuit board 310 is generally rectangular, having a width approximately equal to the length of the housing 204 and a length approximately equal to the circumference of the housing 204. The flexible printed circuit board 310 may be rolled, bent or flexed around the sidewall of the housing 204 to form a close fitting sleeve that extends substantially around the circumference of the housing 204, covering the sidewall.

The flexible printed circuit board 310 is secured to the outer surface of the sidewall of the housing 204 by an adhesive (not shown). Securing the flexible printed circuit board 310 to the housing 204 ensures a constant close fit between the interdigitated sensor 300 and the housing 204 and the relative arrangement of the pair of electrodes 320 and the liquid storage portion 201 remains constant. It will be appreciated that any other suitable securing means may be used, such as clips or other types of fixings.

It will be appreciated that in other embodiments the interdigitated sensor may be secured to the housing by another securing means. In some embodiments, the interdigitated sensor and the housing may be secured together by an interference or a friction fit. In other embodiments the interdigitated sensor may not be secured to the housing, such that the housing may be removable from the interdigitated sensor. In these embodiments, the sensor may be rolled around a cylindrical tube, having an inner diameter sufficient to accommodate the housing. The cylindrical tube may substantially prevent the interdigitated sensor from being damaged on insertion and removal of the housing.

The pair of electrodes 320 are printed on one side of the flexible printed circuit board 310 and the electrical shielding 330 is printed on the opposite side of the flexible printed circuit board 310, directly opposite the electrodes 320. The pair of electrodes 320 extend substantially over one side of the flexible printed circuit board 310 and the shielding 330 extends substantially over the opposite side of the flexible printed circuit board 310.

Figure 3:
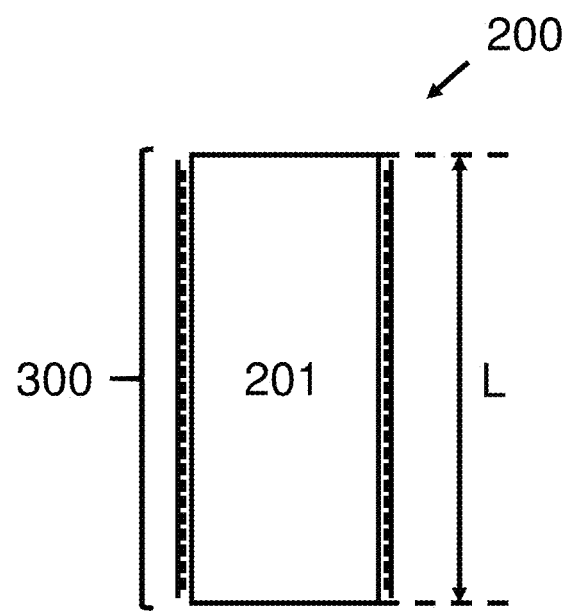
FIG. 3 shows a schematic cross-section of the cartridge of FIG. 2 through the central longitudinal axis A-A.
Figure 4:
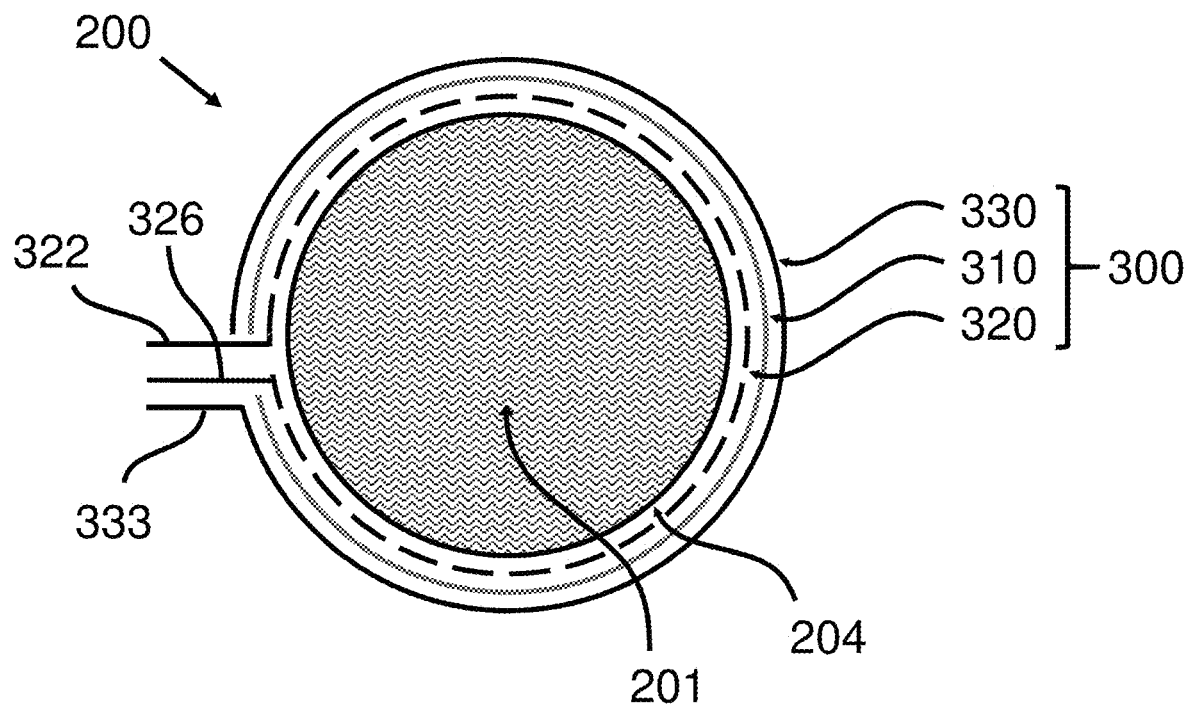
FIG. 4 shows a plan view of the cartridge of FIG. 2.

As shown in FIGS. 3 and 4, the interdigitated sensor 300 extends substantially over the sidewalls of the housing 204. The housing 204 defines a substantially circularly cylindrical liquid storage portion 201 having a central longitudinal axis A-A. The interdigitated sensor 300 is arranged around the housing 204 such that the electrodes 320 face towards the housing 204 and the liquid storage portion 201 and the shielding 330 faces away from the housing 204. In other words, the pair of electrodes 320 are arranged adjacent to the sidewall of the housing 204. As such, the pair of electrodes 320 are arranged to sense electrical properties of the liquid storage portion 201. In particular, the electrodes 320 are arranged to sense liquid aerosol-forming substrate in contact with the sidewalls of the housing 204.

Figure 5:
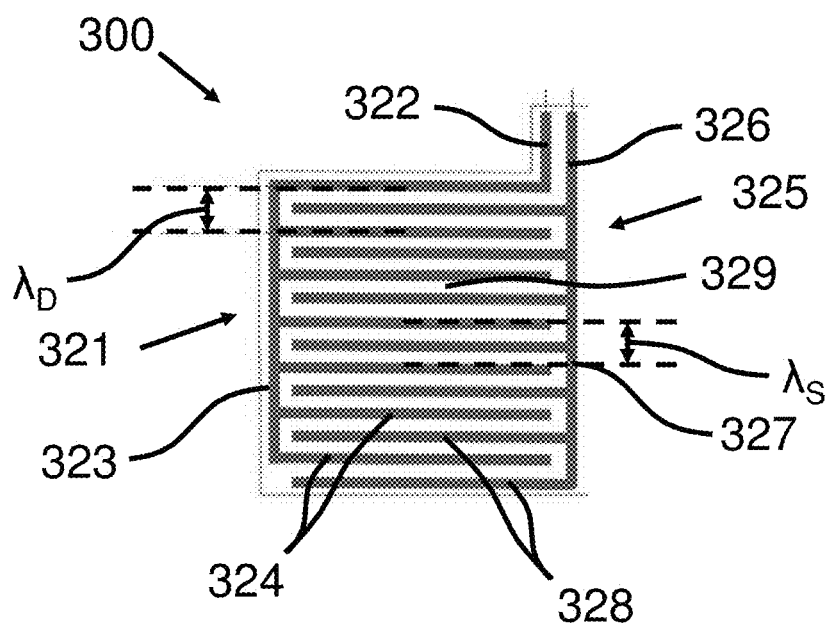
FIG. 5 shows a pair of interdigitated electrodes from the cartridge of FIG. 2.
Figure 6:
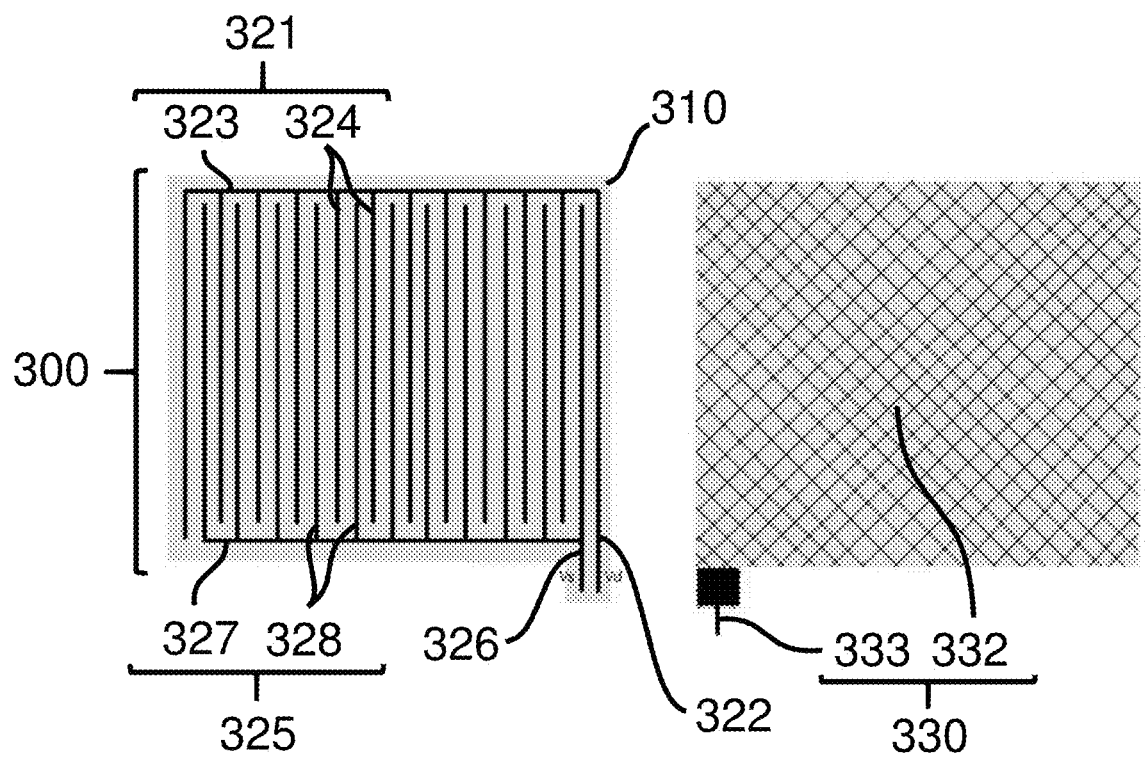
FIG. 6 shows a schematic illustration of an unfolded pair of electrodes and shielding of the cartridge of FIG. 2.

The interdigitated sensor 300 is shown in more detail in FIGS. 5 and 6. The interdigitated sensor 300 comprises a driving electrode 321 and a sensing electrode 325.

The driving electrode 321 comprises a connector 322 for connecting the driving electrode to the control electronics 104 of the main unit 100, a main track or spine 323 connected to the connector 322 and a plurality of protrusions or fingers 324 all of which extend from main track 323 in substantially the same direction. The main track 323 and the fingers 324 form a regular or periodic comb-like structure. The regular spacing of the fingers 324 along the main track 323 provides gaps 329 between successive or adjacent fingers 324. The distance between the centerlines of successive or adjacent fingers 324 is referred to as the band gap $\lambda_D$ of the driving electrode 321.

The sensing electrode 325 also comprises a connector 326, a main track or spine 327 connected to the connector 325 and a plurality of protrusions or fingers 328 extending from the main track 327. The main track 327 and the fingers 328 form a regular or periodic comb-like structure similar to that of the driving electrode 321. The band gap $\lambda_S$ of the sensing electrode 325 is equal to the band gap $\lambda_D$ of the driving electrode 321.

The driving electrode 321 and the sensing electrode 325 are arranged on one side of the printed circuit board 310 such that the main tracks 323, 327 extend substantially in the direction of the length of the circuit board 310 and the fingers 324, 328 extend substantially in the direction of the width of the board 310. The fingers 324 of the driving electrode 321 extend towards the main track 327 of the sensing electrode 325 and the fingers 328 of the sensing electrode 325 extend towards the main track 323 of the driving electrode 321. The fingers 324 of the driving electrode 321 extend into the gaps 329 between adjacent fingers 328 of the sensing electrode 325 and the fingers 328 of the sensing electrode extend into the gaps 329 between adjacent fingers 324 of the driving electrode 321. As such, the driving electrode 321 and the sensing electrode 325 are interdigitated. The lengths and widths of the fingers 324, 328 of the driving and sensing electrodes 321, 325 are chosen such that a substantially constant gap or spacing is provided between the driving and sensing electrodes 321, 325 along the lengths of the electrodes 321, 325. The pair of interdigitated electrodes 320 cover substantially one side of the surface of the printed circuit boards 310.

The connectors 322, 326 may be electrically connected to the control electronics 104 of the main unit 100. The control electronics 104 of the main unit 100 may comprise any suitable means for measuring the capacitance between the driving and sensing electrodes 321, 325. In this embodiment, the control electronics 104 comprises a switched capacitor amplifier or integrator. Means for measuring capacitance are well understood in the art, and will not be described in more detail herein.

As shown in FIG. 6, shielding 330 is provided on the opposite side of the printed circuit board 310. The shielding comprises an electrically conductive mesh 332 that is printed over the opposite side of the board 310, directly opposite the pair of electrodes 320. The conductive mesh 332 is electrically connected to ground via a connector 333.

Figure 7:
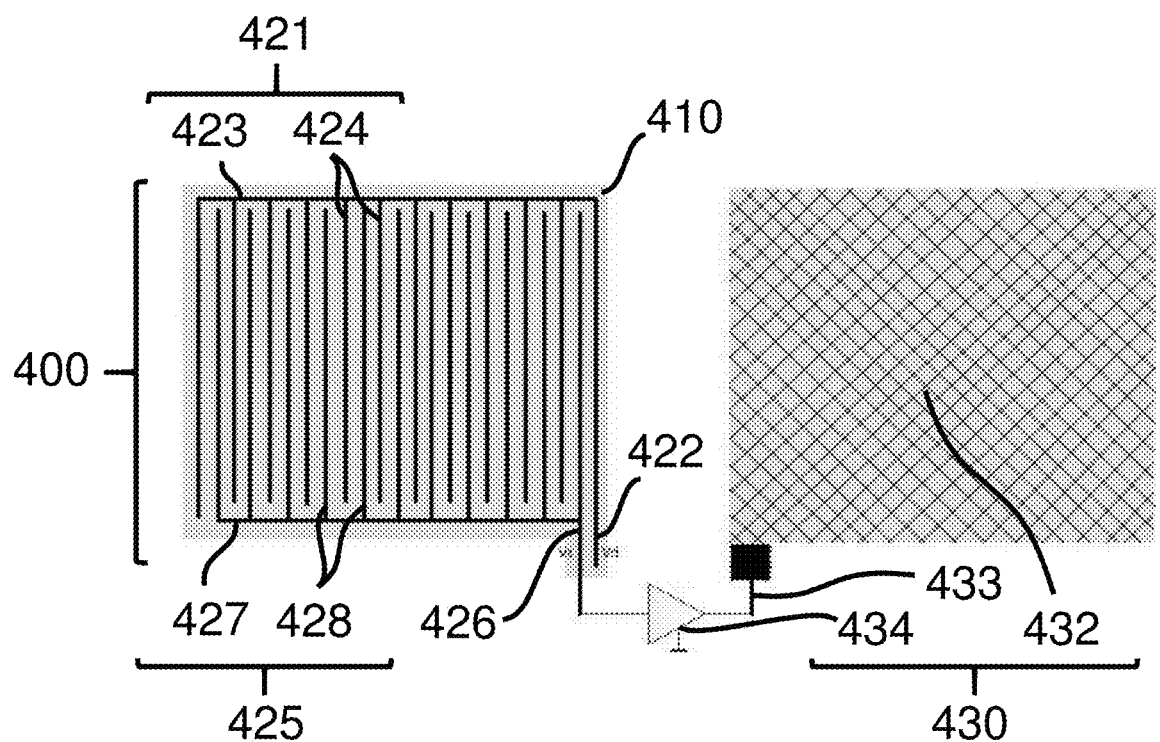
FIG. 7 shows a schematic illustration of an unfolded pair of electrodes and shielding from a cartridge according to another embodiment of at least some example embodiments.

FIG. 7 shows an interdigitated sensor 400 according to at least some other example embodiments. The interdigitated sensor 400 comprises a printed circuit board 410 and a pair of interdigitated electrodes 421, 425 that are substantially identical to the printed circuit board 310 and the pair of interdigitated electrodes 320 of the interdigitated sensor 300. The pair of interdigitated electrodes comprise a driving electrode 421 having a connector 422, a main track 423 and fingers 424, and a sensing electrode 425 having a connector 426, a main track 427 and fingers 428, substantially similar to the interdigitated sensor 300. However, the interdigitated sensor 400 comprise a different shielding configuration on the opposite side of the printed circuit board 410 to the interdigitated sensor 300. The shielding 430 of the interdigitated sensor 400 comprises a conductive mesh 432 extending over the opposite side of the printed circuit board 410, directly opposite the pair of electrodes 421, 425. The mesh 432 comprises a connector 433 that is electrically connected to the connector 426 of the sensing electrode 425 of the pair of electrodes 420 via a voltage follower 434.

Referring back to the main unit 100 shown in FIG. 1, the control system of the main unit 100 (i.e. the control electronics 104) is configured to receive orientation and acceleration information from the inertial measurement unit 110. The control system is also configured to apply an oscillating measurement signal to the interdigitated sensor 300 around the liquid storage portion 201 and to measure an electrical quantity between the electrodes 321, 325.

As mentioned above, a pair of interdigitated electrodes generates an electrical field that has a limited penetration depth. As a result, a pair of interdigitated electrodes circumscribing the sidewalls of a liquid storage portion tend to sense the presence or absence of liquid aerosol-forming substrate at the sidewalls of the liquid storage portion. The proportion or fraction of the surface area of the sidewalls that is covered by liquid aerosol-forming substrate depends on the shape and dimensions of the liquid storage portion, the amount of liquid aerosol-forming substrate held in the liquid storage portion and the orientation of the liquid storage portion. The surface area of the liquid storage portion that is in contact with liquid aerosol-forming substrate is referred to herein as the 'wetted' surface area.

When the liquid storage portion 201 is substantially stationary or moving at a substantially constant velocity, the shape of the liquid aerosol-forming substrate in the liquid storage portion may remain substantially constant and the wetted surface area of the liquid storage portion may remaining substantially constant. However, when the liquid storage portion is accelerated, the shape of the liquid aerosol-forming substrate in the liquid storage portion may vary and the wetted surface area of the liquid storage portion may vary. As such, if the liquid storage portion 201 is being accelerated when a measurement between the pair of interdigitated electrodes 320 is taken, the measured electrical quantity may provide an altered indication of the amount of liquid aerosol-forming substrate held in the liquid storage portion.

When the system is switched on, the control system is configured to determine whether the liquid storage portion 201 is in one of a stable and an unstable condition based on acceleration information received from the inertial measurement unit 110. The control system compares the acceleration information received from the inertial measurement unit 110 to an acceleration threshold value stored in a memory of the microprocessor.

If the control system determines that the measured acceleration information is above the acceleration threshold value, the control system determines that the liquid storage portion 201 is in an unstable condition and the control system does not proceed to supply an oscillating measurement signal to the interdigitated sensor 300 to determine the amount of liquid aerosol-forming substrate held in the liquid storage portion 201.

When the control system determines that the measured acceleration information is below the acceleration threshold value, the control system determines that the liquid storage portion 201 is in a stable condition and the control system proceeds to supply an oscillating measurement signal to the interdigitated sensor 300 and to determine the amount of liquid aerosol-forming substrate held in the liquid storage portion 201.

The control system is configured to control or modulate the supply of power to the coil 111 based on the orientation information received from the inertial measurement unit 110 and the determined amount of liquid aerosol-forming substrate in the liquid storage portion 201, as described in more detail in relation to FIG. 13 later on.

The control system is also configured to repeat the determination of whether the liquid storage portion 201 is in a stable or an unstable condition after each puff, and to determine the amount of liquid aerosol-forming substrate in the liquid storage portion 201 when the liquid storage portion 201 is determined to be in a stable condition.

The control system is configured to use electrical quantity information measured between the electrodes and orientation information received from the inertial measurement unit to determine the amount of liquid aerosol-forming substrate that is held in the liquid storage portion. Typically, the electrical quantity measured between the electrodes is capacitance.

The electrical quantity measurements are related to the fraction or percentage of the surface area of the sidewalls of the liquid storage portion that is in contact with the liquid aerosol-forming substrate. In some embodiments, the control system may use the electrical quantity measurements to determine a wetted surface area of the sidewalls of the liquid storage portion.

In some embodiments, the control system may be configured to determine the amount of liquid aerosol-forming substrate held in the liquid storage portion by comparison. In other words, the control system may comprise a lookup table storing reference orientation information, reference electrical quantity information or wetted surface area information associated with the reference orientation information and reference amount information associated with the reference electrical quantity information or the wetted surface area information. The control system may compare orientation information received from the sensor to the reference orientation information, and compare measured electrical quantity information or determined wetted surface area information to the reference electrical quantity information or the reference wetted surface area information.

In some embodiments, the relationship between the wetted surface area of the sidewalls of the liquid storage portion and the amount of liquid in the liquid storage portion may be known for a liquid storage portion when the liquid storage portion is at particular orientations. Typically, the relationship may be known when the liquid storage portion is in vertical and horizontal orientations. The known relationships may be stored in a memory of the control system, such that the control system may use the known relationship to accurately determine the amount of liquid aerosol-forming substrate that is held in the liquid storage portion when the liquid storage portion is determined to be at one of the known orientations.

Figure 8:
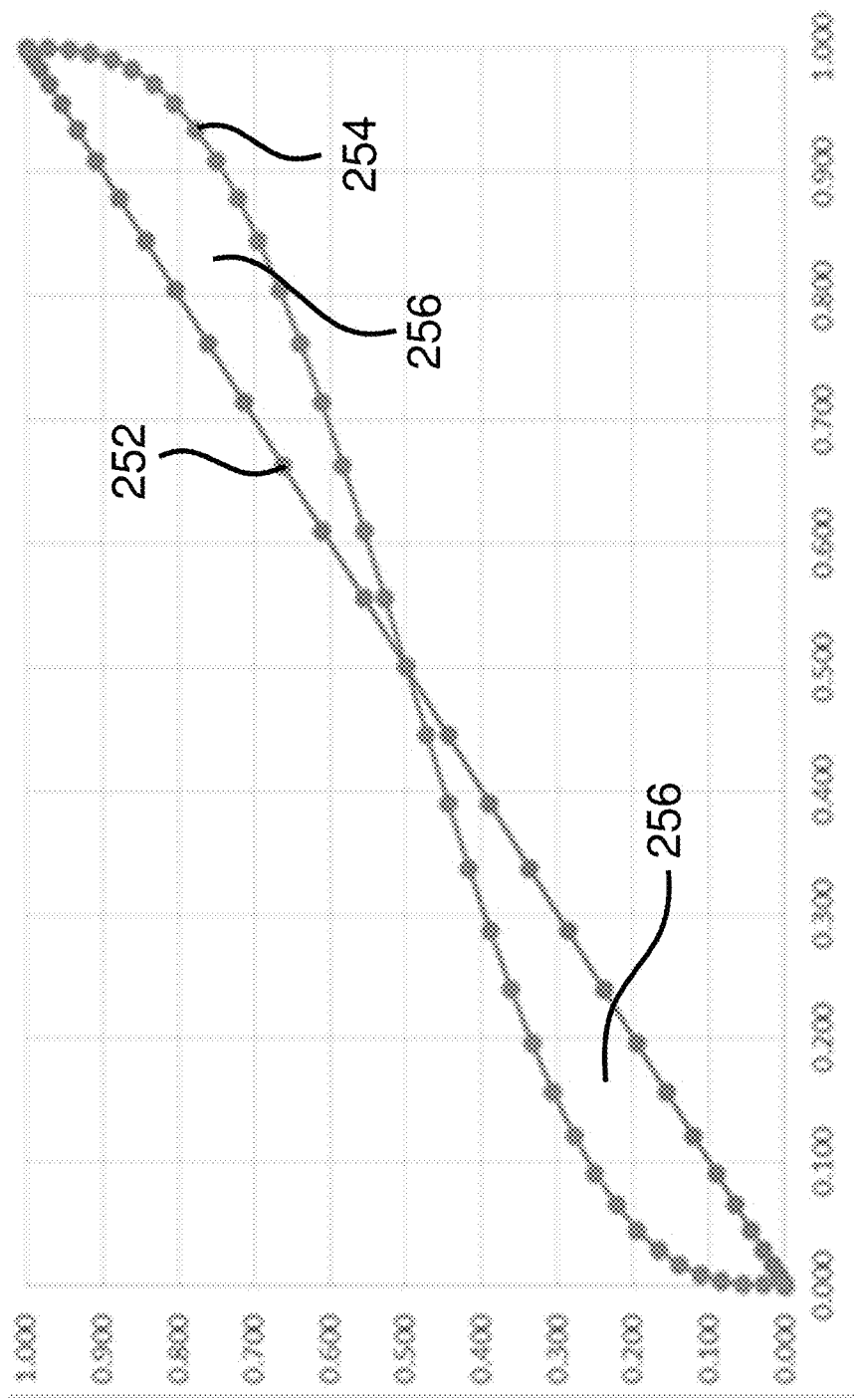
FIG. 8 shows a normalized graph of the wetted surface of the sidewalls of the pre-dispersion formulation storage portion versus the amount of pre-dispersion formulation held in the pre-dispersion formulation storage portion of the cartridge of FIG. 2.

FIG. 8 shows two example known relationships between the normalized surface area S of the sidewalls of the liquid storage portion in contact with liquid aerosol-forming substrate (i.e. 0 corresponds to none of the surfaces being covered by liquid and 1 corresponds to all of the surfaces being covered by liquid) and the normalized amount of liquid aerosol-forming substrate held in the liquid storage portion (i.e. 0 corresponds to the liquid storage portion being empty of liquid and 1 corresponds to the liquid storage portion being full of liquid) for the cylindrical liquid storage portion 201.

As shown in FIG. 8, when the liquid storage portion is in a vertical orientation 252, the relationship between the wetted surface area and the amount of liquid in the liquid storage portion is substantially linear. This is because the cross-section of the liquid storage portion is uniform along the central longitudinal axis of the liquid storage portion.

Also as shown in FIG. 8, when the liquid storage portion is horizontal 254, the relationship between the wetted surface area and the amount of liquid in the liquid storage portion is not linear.

When the liquid storage portion is at non-vertical and non-horizontal orientations, the relationship between the wetted surface area of the sidewalls of the liquid storage portion and the amount of liquid in the liquid storage portion falls within the regions 256 of the graph of FIG. 8. FIGS. 10a-d and FIGS. 11a-b show the liquid storage portion 200 at tilted or inclined orientations that are non-vertical and non-horizontal. The relationship between the wetted surface area of the sidewalls of the liquid storage portion and the amount of liquid aerosol-forming substrate held in the liquid storage portion fall within the regions 256 of the graph of FIG. 8 for these cases. The relationships for these cases may be unknown to the control system and may not be stored by the control system.

The control system may be configured to approximate the amount of liquid aerosol-forming substrate held in the liquid storage portion when the liquid storage portion is a non-vertical and non-horizontal orientations. In particular, the control system may be configured to underestimate the amount of liquid aerosol-forming substrate held in the liquid storage portion. For example, for non-vertical and non-horizontal cases, if the wetted surface area is determined to be less than half the maximum wetted surface area, the control system may be configured to use the amount associated with the horizontal orientation case, and if the wetted surface area is determined to be greater than half the maximum wetted surface area, the control system may be configured to use the amount associated with the vertical orientation case. The control system may be configured to correct the underestimated, approximate amount value when the liquid storage portion is returned to a vertical or a horizontal orientation.

In one embodiment, the control system is configured to calculate the volume V of liquid aerosol-forming substrate held in the liquid storage portion.

The control system measures an electrical quantity between the pair of interdigitated electrodes and determines the wetted surface area S of the sidewalls of the liquid storage portion. The control system also receives orientation information from the inertial measurement unit and determines the angle of inclination $\theta$ of the liquid storage portion from the received orientation information. It will be appreciated that the control system may define any suitable angle as the angle of inclination, relative to the liquid storage portion. However, in these embodiments, the control system defines the angle of inclination $\theta$ to be the angle between the vertical and a longitudinal axis of the liquid storage portion.

The control system is configured to calculate the volume V of the liquid aerosol-forming substrate held in the liquid storage portion using the angle of inclination $\theta$ of the liquid storage portion, the wetted surface area S of the sidewalls of the liquid storage portion and known dimensions of the liquid storage portion, such as the length L and the radius r of the liquid storage portion.

It is necessary for the control system to determine the shape of the liquid aerosol-forming substrate in the liquid storage portion in order to be able to accurately calculate the volume V of liquid aerosol-forming substrate. As mentioned above, the shape formed by the liquid aerosol-forming substrate depends on the angle of inclination $\theta$ of the liquid storage portion. A plurality of reference orientation values $\theta_{ri}$ are stored in the control system. The reference orientation values $\theta_{ri}$ define particular angles of inclination and ranges of angles of inclination within which the shape of the liquid aerosol-forming substrate is known. The control system is configured to compare the angle of inclination $\theta$ determined from the orientation information received from the sensor to the stored reference orientation values $\theta_{ri}$ to determine whether the liquid aerosol-forming substrate is at a known shape. The equations for several example known shapes are provided below.

Figure 9:
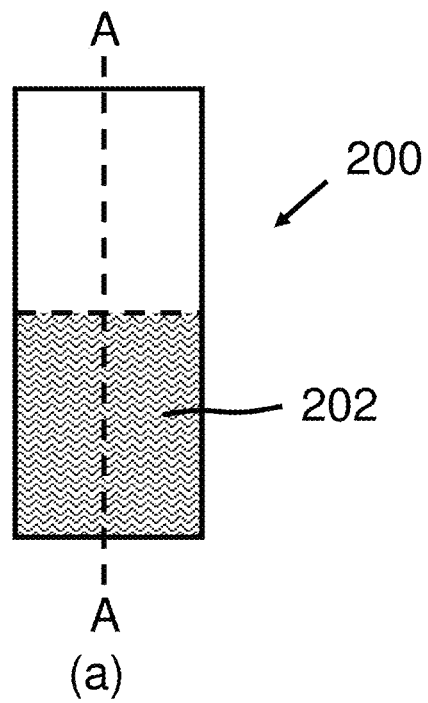
Figure 9:
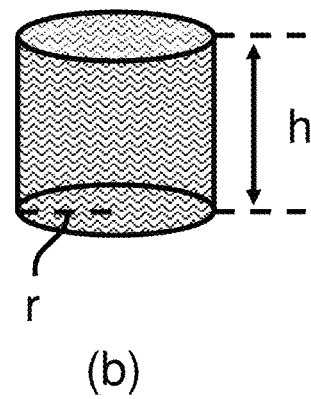
Figure 9:
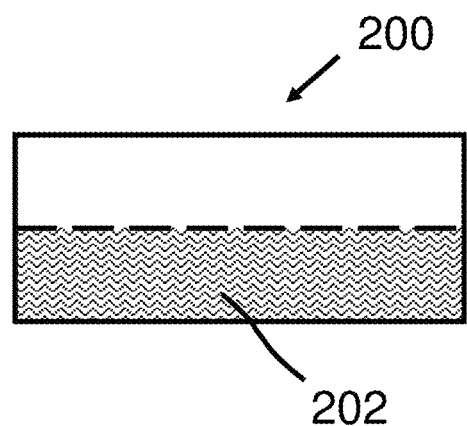
Figure 9:
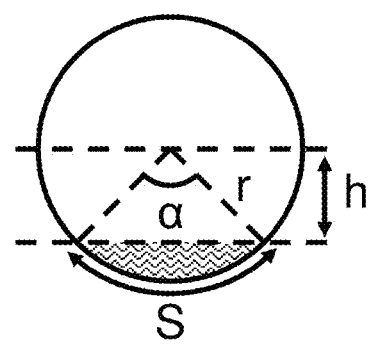

FIGS. 9a and 9b show the liquid storage portion 200 in an upright, vertical orientation. In this orientation, the angle of inclination $\theta$ of the liquid storage portion is 0 and the liquid aerosol-forming substrate forms a cylinder, with a radius r and a height h. The control system stores a first reference orientation value $\theta_{r1}$ of 0. The liquid aerosol-forming substrate also forms a cylinder if the liquid storage portion is inverted by 180°, and so the control system stores a second reference orientation value $\theta_{r2}$ of 180°.

If the determined angle of inclination $\theta$ matches the first or second reference orientation values $\theta_{r1}$, $\theta_{r2}$ the control system determines that the liquid aerosol-forming substrate forms a cylinder. The radius r of the cylinder of liquid aerosol-forming substrate is a known value, because it is the radius of the liquid storage portion. The surface area S of the sidewalls of the cylinder of liquid aerosol-forming substrate is also known value from the measurements of the electrical quantity between the pair of electrodes. Therefore, the height h of the cylinder of liquid aerosol-forming substrate is calculated using Equation 1:

$$S = 2\pi r h \qquad \text{(Equation 1)}$$

The volume V of the cylinder of liquid aerosol-forming substrate may be calculated by determining the height h of the cylinder using Equation 1 or alternatively by substituting Equation 1 into the equation for the volume V of the cylinder, as shown in Equation 2:

$$V = \pi r^2 h = \tfrac{1}{2} rS \quad \text{(Equation 2)}$$

The maximum surface area $S_{max}$ and volume $V_{max}$ of the cylinder of liquid aerosol-forming substrate are known values, as the maximum surface area and volume of the cylinder are equal to the surface area and the volume of the liquid storage portion, where the height h of the cylinder of liquid aerosol-forming substrate is equal to the length L of the liquid storage portion. When the liquid storage portion is full of liquid aerosol-forming substrate, the surface area S of the sidewalls of the liquid storage portion that is in contact with the liquid aerosol-forming substrate should remain constant at the maximum value $S_{max}$, regardless of the orientation of the liquid storage portion. Therefore, the control system is configured to compare the determined surface area S to the maximum surface area $S_{max}$, before determining the angle of inclination and the shape of the liquid aerosol-forming substrate. If the determined surface area S is equal to the maximum surface area $S_{max}$, the control system determines that the liquid storage portion is full of liquid aerosol-forming substrate.

If the control system determines that the liquid storage portion is not full and is not in a vertical orientation, the control system compares the determined angle of inclination θ to further reference orientation values to determine the shape of the liquid aerosol-forming substrate.

FIGS. 9c and 9d show the liquid storage portion 200 in a horizontal orientation. In this orientation, the angle of inclination θ of the liquid storage portion is either 90° or 270°. The control system stores a third reference orientation value $\theta_{r3}$ of 90° and a fourth reference orientation value $\theta_{r4}$ of 270°. If the determined angle of inclination θ matches the third or fourth reference orientation values $\theta_{r3}$, $\theta_{r4}$ the control system determines that the liquid aerosol-forming substrate forms a horizontal cylindrical segment.

If the control system determines that the liquid aerosol-forming substrate forms a horizontal cylindrical segment, the control system calculates the volume of liquid aerosol-forming substrate V in the liquid storage portion by calculating the volume of a horizontal cylindrical segment. The equation for the surface area S of the sidewalls of a horizontal cylindrical segment is shown Equation 3:

$$S = r\alpha L \quad \text{(Equation 3)}$$

Equation 3 comprises one unknown value, the angle of the cylindrical segment α. The equation for the volume V of the horizontal segment comprises the same unknown value, the angle α. To calculate the volume V of the horizontal segment, the angle α may be calculated using Equation 3 and input into the equation for the volume V of the horizontal segment, or alternatively, Equation 3 may be substituted into the equation for the volume V to remove the angle α from the equation, as shown in Equation 4:

$$V = \tfrac{1}{2} r^2 L(\alpha - \sin\alpha) = \tfrac{1}{2} r\left(S - rL\sin\left(\tfrac{S}{rL}\right)\right) \quad \text{(Equation 4)}$$

In some embodiments, the control system may be configured to determine the volume of liquid aerosol-forming substrate held in the liquid storage portion when the liquid storage portion is determined to be at vertical and horizontal orientations only.

In at least some example embodiments, the control system is configured to determine the volume of liquid aerosol-forming substrate in the liquid storage portion when the liquid storage portion is at other, non-vertical and non-horizontal orientations.

Figure 10:
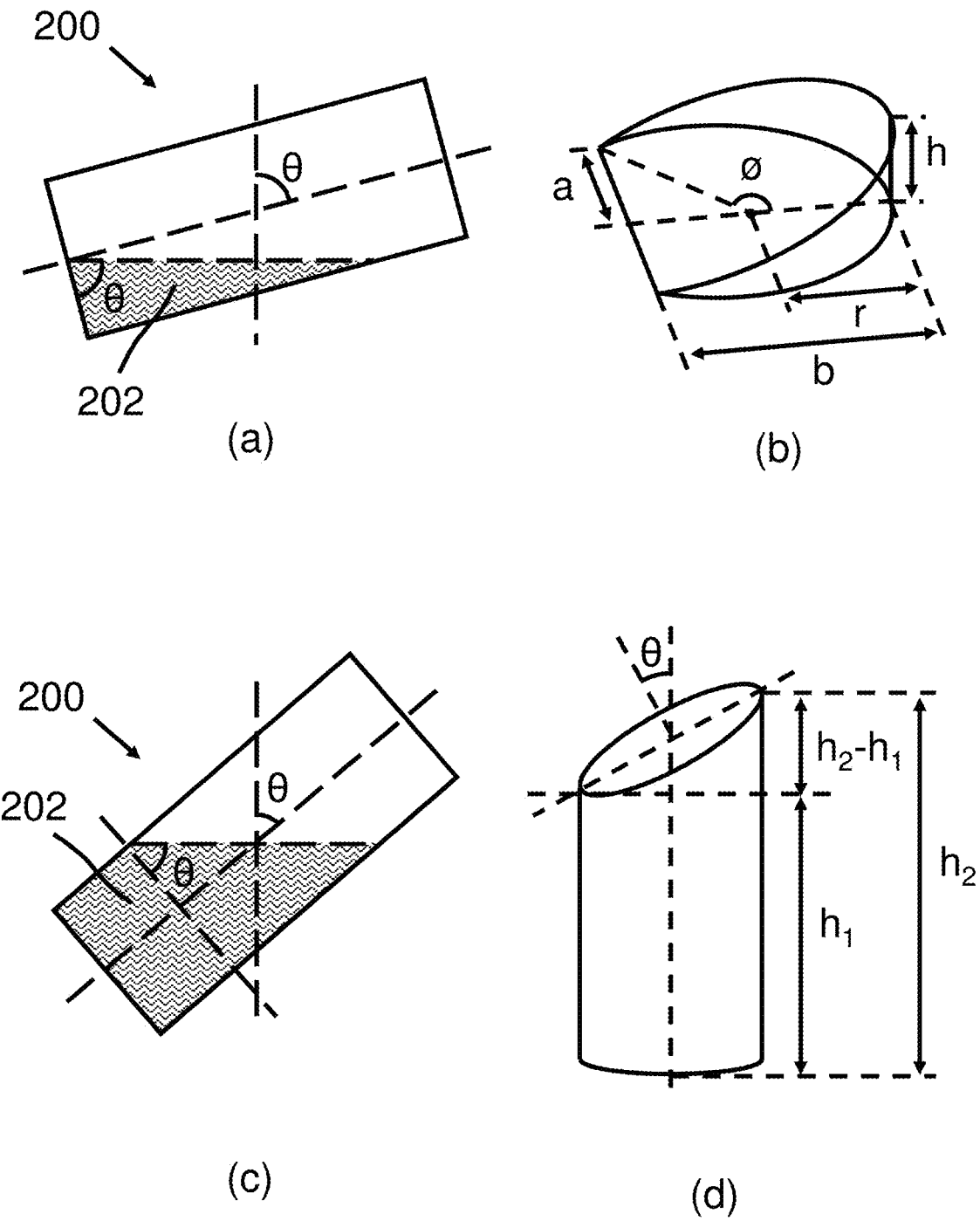

When the liquid storage portion is at certain angles of inclination θ, the liquid aerosol-forming substrate may form a cylindrical wedge, as shown in FIGS. 10a and 10b. There is a maximum angle of inclination $\theta_{r5}$ at which the liquid aerosol-forming substrate forms a cylindrical wedge in the liquid storage portion, regardless of the volume V of liquid aerosol-forming substrate held in the liquid storage portion. The maximum angle of inclination $\theta_{r5}$ is the angle at which the height h of the cylindrical wedge equals the length L of the liquid storage portion. The height h of the cylindrical wedge is given by Equation 5:

$$h = r(1 - \cos\varnothing)\tan\theta \quad \text{(Equation 5)}$$

The maximum angle $\theta_{r5}$ may be determined using Equation 5, as shown in Equation 6:

$$\theta_{r5} = \tan^{-1}\left(\frac{L}{r(1 - \cos\varnothing)}\right) \quad \text{(Equation 6)}$$

Equation 6 comprises one unknown value, the angle ø at the base of the wedge between a radius extending to an end of the chord and the radius extending to the point on the base from which the height h of the wedge is measured.

Equation 5 may be used to calculate the angle ø. Equation 5 comprises two unknown values, the height h and the angle ø at the base of the wedge between a radius extending to an end of the chord and the radius extending to the point on the base from which the height h of the wedge is measured. The equation for calculating the surface area S of the sidewalls of the wedge comprises the same two unknown values as Equation 5, the height h and the angle ø. Therefore, Equation 5 may be introduced into the equation for calculating the surface area S to find either of the unknown values, h or ø, as shown in Equation 7:

$$S = 2hr\left(\frac{\sin\varnothing - \varnothing\cos\varnothing}{1 - \cos\varnothing}\right) = 2r^2(\sin\varnothing - \varnothing\cos\varnothing)\tan\theta \quad \text{(Equation 7)}$$

To determine the maximum angle $\theta_{r5}$, the angle ø may be calculated using Equation 7 and ø may be input into Equation 6, or alternatively, Equation 7 may be substituted into Equation 6 to remove the unknown angle ø from Equation 6.

The control system may be configured to compare the angle of inclination θ of the liquid storage portion to a fifth reference orientation value, the angle $\theta_{r5}$, to determine whether the liquid aerosol-forming substrate is in the form of a cylindrical wedge. If the control system determines that the angle of inclination θ of the liquid storage portion is less than or equal to the maximum angle $\theta_{r5}$, the control system determines that the liquid aerosol-forming substrate forms a cylindrical wedge and calculates the volume V of liquid aerosol-forming substrate in the liquid storage portion as the volume of a cylindrical wedge.

The equation for calculating the volume V of the cylindrical wedge comprises three unknown values, the same two unknown values as Equation 5, the height h and the angle ø, and the volume V of the cylindrical wedge. Equation 5 may be introduced into the equation for calculating the volume V of the cylindrical wedge, as shown in Equation 8:

$$V = \frac{hr^2}{3}\left(\frac{3\sin\phi - 3\phi\cos\phi - \sin^3\phi}{1-\cos\phi}\right) = \quad \text{(Equation 8)}$$

$$\frac{r^3}{3}(3\sin\phi - 3\phi\cos\phi - \sin^3\phi)\tan\theta$$

Equation 8 comprises two unknown values, the volume V and the angle ø. To determine the volume V of the cylindrical wedge, the angle ø may be determined using Equation 7 and ø may be input into Equation 8, or alternatively, Equation 7 may be introduced into Equation 8 to remove the unknown angle ø.

If the control system determines that the angle of inclination θ of the liquid storage portion is greater than the fifth reference orientation value $\theta_{r5}$, the control system may determine that the liquid aerosol-forming substrate does not form a cylindrical wedge and may compare the angle of inclination θ to other reference orientations to determine the shape of the liquid aerosol-forming substrate.

At certain other angles of inclination θ, the liquid aerosol-forming substrate forms a cylindrical segment in the liquid storage portion, as shown in FIGS. 10*c* and 10*d*. The liquid aerosol-forming substrate may form a cylindrical segment when the angle of inclination θ of the liquid storage portion is less than two angles, $\theta_{r6}$, $\theta_{r7}$, regardless of the volume V of liquid aerosol-forming substrate in the liquid storage portion. The cylindrical segment has two heights, a minimum or, alternatively, first height $h_1$ at one side and a maximum or, alternatively, second height $h_2$ at the opposite side. The first angle $\theta_{r6}$ is the angle at which the minimum height $h_1$ of the segment is equal to 0. The second angle $\theta_{r7}$ is the angle at which the maximum height $h_2$ is equal to the length L of the liquid storage portion.

The angles $\theta_{r6}$, $\theta_{r7}$ may be calculated using the relationship between the minimum and maximum heights $h_1$, $h_2$ of the cylindrical segment and the angle of inclination θ of the liquid storage portion, as shown in Equation 9:

$$h_2 - h_1 = 2r \tan\theta \quad \text{(Equation 9)}$$

Equation 9 comprises two unknown values, the heights $h_1$ and $h_2$. The equation for calculating the surface area S of the sidewalls of the cylindrical segment comprises the same two unknown values as Equation 9, the heights $h_1$ and $h_2$, as shown in Equation 10:

$$S = \pi r(h_1 + h_2) \quad \text{(Equation 10)}$$

Equation 9 may be substituted into Equation 10 to remove either of the unknown heights $h_2$, $h_1$. To calculate the first angle $\theta_{r6}$, Equation 9 may be substituted into Equation 10 to remove the maximum height $h_2$, as shown in Equation 11:

$$S = 2\pi R(h_1 + h_2) = \pi R(h_1 + R \tan\theta) \quad \text{(Equation 11)}$$

The first angle $\theta_{r6}$ may then be calculated by setting the minimum height $h_1$ to 0 in Equation 11, as shown in Equation 12:

$$\theta_{r6} = \tan^{-1}\left(\frac{S}{2\pi r^2}\right) \quad \text{(Equation 12)}$$

The second angle $\theta_{r7}$ may be calculated by substituting Equation 9 into Equation 10 to remove the minimum height $h_1$ and setting the maximum height $h_2$ to the length L of the liquid storage portion, as shown in Equation 13:

$$\theta_{r7} = \tan^{-1}\left(\frac{(2\pi RL) - S}{2\pi R^2}\right) \quad \text{(Equation 13)}$$

The control system is configured to compare the angle of inclination θ of the liquid storage portion to a sixth and seventh reference orientation values, the angles $\theta_{r6}$ and $\theta_{r7}$, to determine whether the liquid aerosol-forming substrate is in the form of a cylindrical segment. If the control system determines that the angle of inclination θ of the liquid storage portion is less than or equal to the sixth and seventh reference orientation values, $\theta_{r6}$ and $\theta_{r7}$, the control system determines that the liquid aerosol-forming substrate forms a cylindrical segment and calculates the volume V of liquid aerosol-forming substrate in the liquid storage portion as the volume of a cylindrical segment.

The equation for calculating the volume V of the cylindrical segment comprises the same two unknown values, the heights $h_1$ and $h_2$, as Equation 10. The heights $h_1$ and $h_2$ are in the same relationship in the equation for calculating the volume V of the cylindrical segment as in Equation 9. Therefore, Equation 9 may be substituted into the equation for the volume V of the cylindrical segment to remove the unknown heights $h_1$ and $h_2$, as shown in Equation 14:

$$V = \tfrac{1}{2}\pi R^2(h_1 + h_2) = \tfrac{1}{2}rS \quad \text{(Equation 14)}$$

Equation 14 shows that the volume V of a cylindrical segment of liquid aerosol-forming substrate may be calculated using the same equation as the volume of the cylinder when the liquid aerosol-forming substrate is in a vertical orientation (Equation 2).

If the control system determines that the angle of inclination θ of the liquid storage portion is greater than the sixth and seventh reference orientation value, $\theta_{r6}$, $\theta_{r7}$, the control system determines that the liquid aerosol-forming substrate does not form a cylindrical segment and may compare the angle of inclination θ to other reference orientations to determine the shape of the liquid aerosol-forming substrate.

Figure 11:
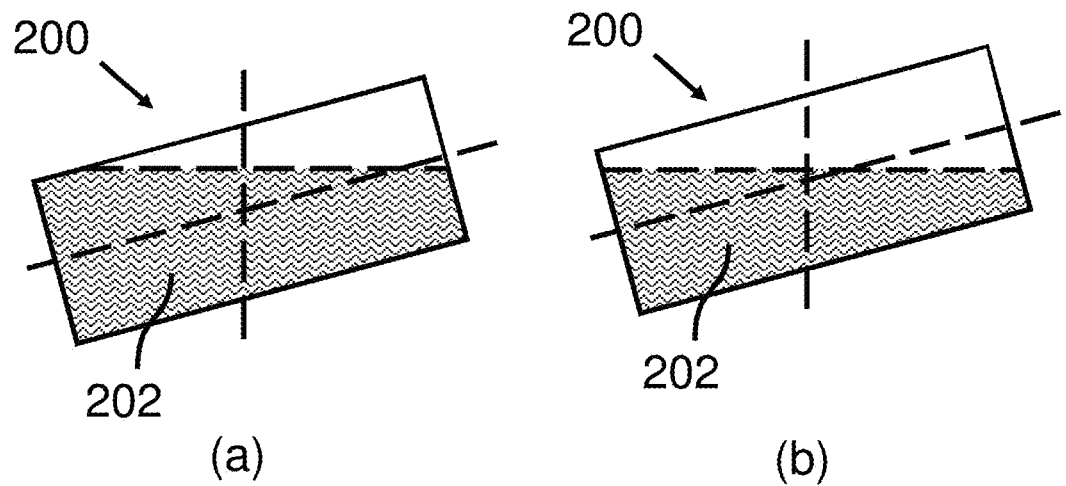
FIG. 11a shows a schematic illustration of the cartridge of FIG. 2 holding pre-dispersion formulation in another non-vertical and non-horizontal orientation.
FIG. 11b shows another schematic illustration of the cartridge of FIG. 2 holding pre-dispersion formulation in a non-vertical and non-horizontal orientation.

The control system may be configured to determine the volume of the liquid aerosol-forming substrate for additional cases, where the liquid aerosol-forming substrate does not form a cylinder, a cylindrical segment or a cylindrical wedge. Examples of such cases are shown in FIGS. 11*a* and 11*b*. However, typically the control system is configured to approximate the shape of the liquid aerosol-forming substrate to one of the known shapes described above in these additional cases. Where the control system is configured to approximate the shape of the liquid aerosol-forming substrate, the control system is configured to underestimate the volume of liquid aerosol-forming substrate held in the liquid storage portion.

Typically, the control system is configured to determine the volume of liquid aerosol-forming substrate in the liquid storage portion immediately after being turned on and after each puff. If the control system is required to approximate the shape of the liquid aerosol-forming substrate on start-up or after a puff, the control system may be configured to update the estimate the next time the liquid storage portion is determined to be in a stable vertical or horizontal orientation.

Figure 12:
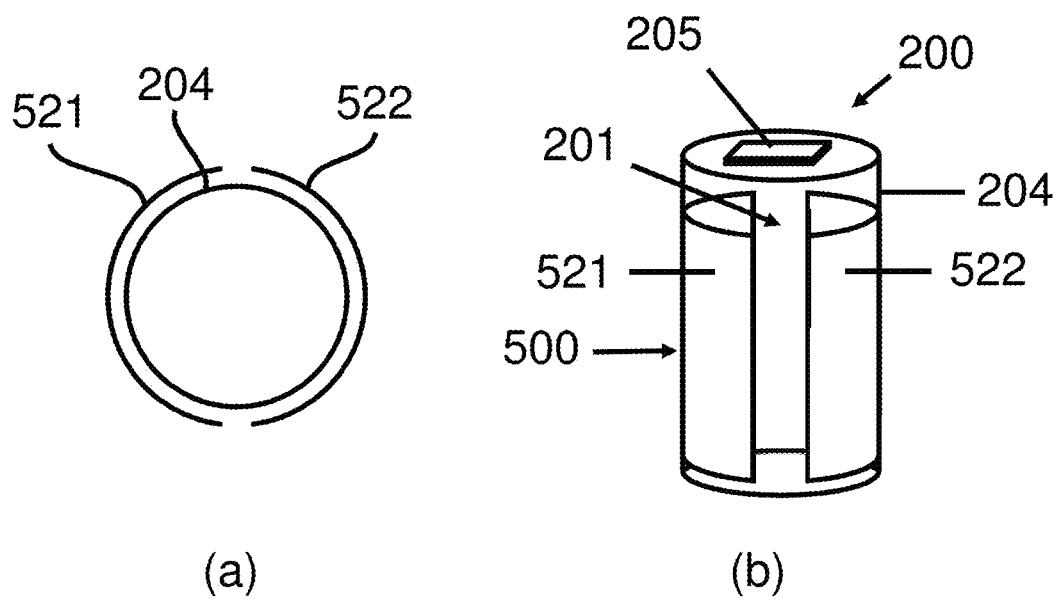

FIGS. 12*a* and 12*b* show a cartridge 200 according to at least some other example embodiments. The cartridge 200 shown in FIGS. 12*a* and 12*b* is substantially identical to the cartridge 200 shown in FIGS. 2 to 4 and comprises an interdigitated sensor 500 comprising a pair of electrodes 521, 522. The pair of electrodes 521, 522 are not interdigitated electrodes, but rather are plate electrodes arranged at opposite sides of the liquid storage portion 201 of the housing 204, such that a portion of the liquid storage portion is arranged between the pair of electrodes 521, 522.

Each electrode 521, 522 comprises a curved plate that extends the length of the housing 204 and circumscribes about half of the circumference of the housing 204. As such, the first pair of electrodes 521, 522 substantially surround the liquid storage portion 201 and substantially the entire liquid storage portion 201 is arranged between the pair of electrodes 521, 522. In effect, the pair of electrodes 521, 522 form a capacitor and the liquid storage portion 201 forms the dielectric of the capacitor.

The plate electrodes 521, 522 do not measure the wetted surface area of the sidewalls of the liquid storage portion, but rather measure the average electrical properties of the liquid storage portion 201 between the electrodes. As such, the shape of the liquid aerosol-forming substrate held in the liquid storage portion may not be determined using the plate electrodes 521, 522.

Figure 13:
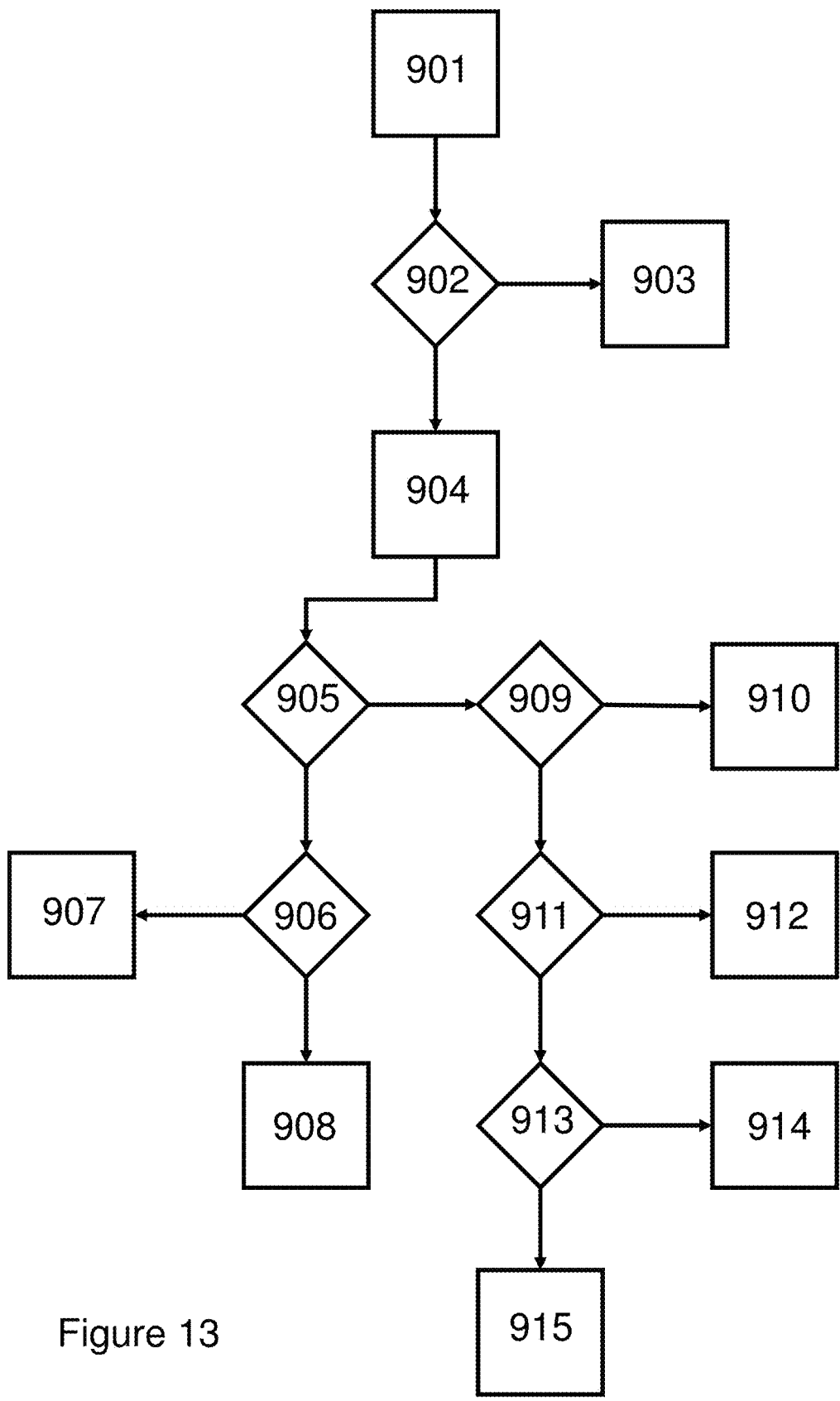
FIG. 13 shows a block diagram depicting a configuration for the control system of the dispersion-generating system of FIG. 1.

FIG. 13 shows an example configuration for a control system in accordance with at least some example embodiments. The configuration shown in FIG. 13 uses the received orientation information from the sensor and the determined amount of liquid aerosol-forming substrate held in the liquid storage portion to control the power that is supplied to the aerosol-generating means.

When the liquid storage portion is not full of liquid aerosol-forming substrate and when the liquid storage portion is not in the upright orientation, the aerosol-forming substrate may not be in full contact with the wick or aerosol-generating means. In these cases, the aerosol-generating means may not receive a sufficient supply of liquid aerosol-forming substrate to be operated at full power and generate an acceptable aerosol. These conditions will be referred to as 'dry' conditions. To compensate for variations in the supply of liquid aerosol-forming substrate to the aerosol-generating means due to changes in the amount of liquid aerosol-forming substrate held in the liquid storage portion and changes in the orientation of the liquid storage portion, the control system may be configured to control or modulate the power supplied to the aerosol-generating means based on the determined orientation and amount of liquid aerosol-forming substrate held in the liquid storage portion.

Referring to FIG. 13, the control system receives 901 orientation information from the sensor and, in a first step 902, the control system uses the orientation information from the sensor to determine whether the liquid storage portion is inverted or upside-down, such that gravity may draw liquid aerosol-forming substrate in the liquid storage portion away from the aerosol-generating means.

If the control system determines that the liquid storage portion is upside-down, the control system prevents or inhibits 903 power from being supplied to the aerosol-generating means. This may prevent or inhibit the aerosol-generating system from being operated upside-down, in a 'dry' condition.

If the control system determines that the liquid storage portion is not inverted or upside-down, in a second step 904, the control system determines the amount of liquid aerosol-forming substrate held in the liquid storage portion. The control system supplies an oscillating measurement signal to the pair of electrodes to determine the surface area of the sidewalls of the liquid storage portion that are in contact with liquid aerosol-forming substrate, and the control system uses the orientation information and the determined surface area information to determine the amount of liquid aerosol-forming substrate held in the liquid storage portion.

In a third step 905, the control system determines whether the determined amount of liquid aerosol-forming substrate held in the liquid storage portion is less than 50% of the maximum volume of the liquid storage portion (i.e. the control system determines whether the liquid storage portion is less than half full of liquid aerosol-forming substrate).

If the control system determines that the liquid storage portion is at least 50% full of liquid aerosol-forming substrate, in a fourth step 906, the control system uses the received orientation information to determine whether the liquid storage portion is within 90° of the upright orientation.

If the control system determines that the liquid storage portion is at less than 90° to the upright orientation, the control system supplies 907 full power to the aerosol-generating means. Alternatively, if the control system determines that the liquid storage portion is at 90° to the upright orientation or at more than 90° to the upright orientation, the control system modulates 908 the supply of power to the aerosol-generating means. Typically, the control system supplies less than full power to the aerosol-generating means. The reduction in power is proportional to the determined percentage of the liquid storage portion filled with liquid aerosol-forming substrate. In other words, the lower the amount of liquid aerosol-forming substrate held in the liquid storage portion, the lower the power supplied to the aerosol-generating means.

Returning to the third step 905, if the control system determines that the liquid storage portion is less than 50% full of liquid aerosol-forming substrate, in a fifth step 909, the control system uses the received orientation information to determine whether the liquid storage portion is at more than 135° to the upright orientation.

If the control system determines that the liquid storage portion is at more than 135° to the upright orientation, the control system prevents 910 the supply of power to the aerosol-generating means. This should prevent the aerosol-generating means from being operated in a 'dry' condition. Alternatively, if the control system determines that the liquid storage portion is at 135° or at less than 135° to the upright orientation, in a sixth step 911 the control system uses the received orientation information to determine whether the liquid storage portion is at more than 45° to the upright position.

If the control system determines that the liquid storage portion is at more than 45° to the upright orientation, the control system modulates 912 the supply of power to the aerosol-generating means, as described above at step 908. In other words, the control system supplies less than full power to the aerosol-generating means and reduces the supply of power by an amount proportional to the determined fractional fill of the liquid storage portion. Alternatively, if the control system determines that the liquid storage portion is at 45° to the upright orientation or at more than 45° to the upright orientation, in a seventh step 913 the control system uses the determined amount to determine whether there is sufficient liquid aerosol-forming substrate held in the liquid storage portion for one full puff.

If the control system determines that there is a sufficient amount of liquid aerosol-forming substrate held in the liquid storage portion for one full puff, the control system supplies 914 full power to the heater. Alternatively, if the control system determines that there is not a sufficient amount of liquid aerosol-forming substrate held in the liquid storage portion for one full puff, the control system prevents 915 the supply of power to the aerosol-generating means, which prevents the aerosol-generating system from being operated in a dry condition.

Figure 14:
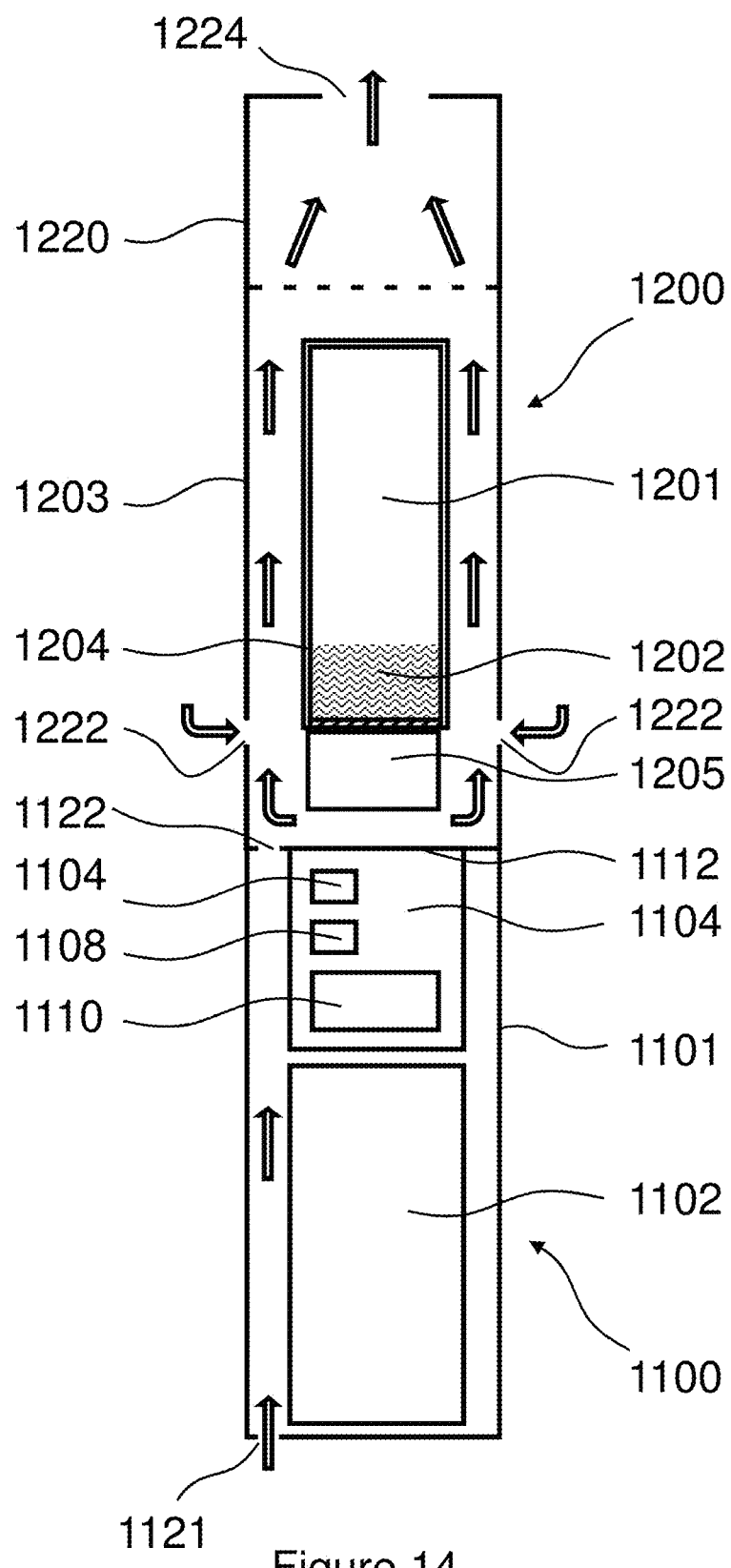
FIG. 14 shows a schematic illustration of a further example dispersion-generating system according to another embodiment of at least some example embodiments.

FIG. 14 is a schematic illustration of another example of an aerosol-generating system according to at least some example embodiments. FIG. 14 is schematic in nature, and the components shown are not necessarily to scale either individually or relative to one another. The aerosol-generating system comprises a main unit 1100, which may be, for example, reusable, in cooperation with a cartridge 1200, which may be, for example, disposable. The aerosol-generating system shown in FIG. 14 is an electrically operated smoking system.

The main unit 1100 comprises a housing 1101. The housing 1101 is substantially circularly cylindrical and has a longitudinal length of about 70 mm and an external diameter of about 20 mm.

The main unit 1100 comprises an electric power supply in the form of a lithium ion phosphate battery 1102 and a control system in the form of control electronics 1104, which are housed within the housing 1101. The control electronics 1104 comprise a puff sensor 1106, in the form of a microphone, an LED 1108, which is activated to indicate that the main unit 1100 is activated, and a sensor in the form of an inertial measurement unit 1110 in accordance with at least some example embodiments, which will be described in more detail below. The puff sensor 1106, LED 1108 and inertial measurement unit 1110 are all mounted on a printed circuit board housed within the housing 1101 of the main unit 1100. The inertial measurement unit is arranged on and in alignment with the longitudinal centerline of the main unit 1100.

The housing 1101 of the main unit 1100 comprises an end 1112 which is configured to receive the cartridge 1200.

The cartridge 1200 comprises a housing 1203. The housing 1203 of the cartridge 1200 is substantially circularly cylindrical and has a longitudinal length of about 30 mm and an external diameter of about 20 mm. The cartridge 1200 includes a mouthpiece portion 1220 including an outlet 1224. The end of the cartridge 1200 opposite the mouthpiece portion 1220 and the outlet 1224 is configured to be received by the end 1212 of the main unit 1100. In this embodiment, the end of the cartridge 1200 comprises a lip (not shown) that is configured to snap fit into a groove (not shown) in the end 1212 of the main unit, to removably secure the cartridge 1200 and the main unit 1100. One or more air inlets 1222 are provided between the mouthpiece portion 1220 and opposite end.

When the cartridge 1200 is received and engaged with the main unit 1100, the main unit 1100 and the cartridge 1200 form a generally circularly cylindrical unit with a length of about 100 mm.

Inside the cartridge housing 1203, a rigid housing 1204 defines a liquid storage portion 1201. The liquid storage portion 1201 is substantially circularly cylindrical and has a central longitudinal axis that is on and aligned with a central longitudinal axis of the cartridge 1200. When the cartridge 1200 is received and engaged with the main unit 1100, the cartridge 1200, liquid storage portion 1201 and the main unit 1100 share a common longitudinal axis.

The liquid storage portion 1201 contains a liquid aerosol-forming substrate 1202. The housing 1204 of the liquid storage portion 1201 is fluid impermeable but has an open end covered by a permeable mesh element 1205. The mesh element 1205 spans a circular open end of the cartridge housing 204. The mesh element 1205 comprises a metallic mesh formed of stainless steel. The aerosol-forming substrate 1202 can form a meniscus in the interstices of the mesh.

The control electronic 1104 of the main unit further comprise electrodes (not shown) that extend from the receiving end 1112 of the main unit 1100. When the cartridge 1200 is received on the end 1112 of the main unit 1100, the electrodes of the control electronics 1104 contact the mesh element 1205 of the cartridge 1200. The electrodes electrically connect the mesh element 1205 to the power supply 1102 of the main unit 1100, and enable power to be supplied to the mesh element 1205 to heat the mesh via resistive heating. The supply of power from the power supply 1102 to the mesh element 1205 is controlled by the control electronics 1104.

In use, puffs on the mouthpiece portion 1220 of the cartridge 1200 include drawing air though the air inlets 1222 in the housing 1203 of the cartridge 1200, into the mouthpiece portion 1220 and out of the outlet 1224. When a puff is performed on the mouthpiece portion, a small air flow is also drawn into the main unit 1100 through a sensor inlet 1121 in the housing 1101, past the microphone 1106 into the cartridge 1200 via an inlet 1122 in the end 1112 of the main unit 1100 and up into the mouthpiece portion 1220 of the cartridge 1200. When a puff is detected by the microphone 1106, the control electronics 104 supply power from the power supply 1102 to the mesh element 1205 of the cartridge 1200, via the electrodes (not shown). The mesh element 1205 heats up as a result of resistive heating and reaches a temperature sufficient to vaporize the aerosol-forming substrate 1202 close to the mesh element 1205. The vaporized aerosol-forming substrate 1205 is entrained in the air flowing from the air inlets 1222 to the air outlet 1224 and cools to form an aerosol within the mouthpiece portion 1220 before exiting the mouthpiece portion 1220. The control electronics 1104 supply power to the mesh element 1205 for a predetermined duration, in this example five seconds, after detection of a puff and then switches the current off until a new puff is detected.

In some embodiments, the main unit comprises indication means for providing a visual, haptic or audible indications. Typically the indication means is in the form of an LED mounted in the housing of the main unit. The control system may be configured to provide indications at various times, for example, when the liquid storage portion is determined to be at a horizontal orientation, when the liquid storage portion is determined to be at a non-horizontal orientation and when the determined amount of liquid aerosol-forming substrate is at or below a threshold. In some embodiments the main unit may prevent further aerosol-generation on determination that the amount of liquid aerosol-forming substrate is at or below the threshold.

It will be appreciated that any features that are described above in one embodiment may also be provided in any of the other embodiments. In particular, it will be appreciated that features described in relation to cartridges may be provided in main units and features relating to main units may be provided in cartridges. It will be appreciated that the liquid storage portion may have any other suitable shape. In the above examples, the liquid storage portions are substantially circularly cylindrical; however, in other embodiments, the liquid storage portion may form a rectangular cuboid or an ovoid. It will be appreciated that in other embodiments, the cartridges may not be cartridges, but rather the cartridges and main units may be integrally formed in a single unit.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

The invention claimed is:

1. An aerosol-generating system comprising:
a liquid storage portion for holding a liquid aerosol-forming substrate;
a pair of electrodes arranged adjacent to or in the liquid storage portion;
a sensor configured to sense an orientation of the liquid storage portion; and
a control system configured to,
measure an electrical quantity between the pair of electrodes,
receive orientation information from the sensor,
identify a shape of the liquid aerosol-forming substrate held in the liquid storage portion based on the orientation information and reference orientation values, and
determine an amount of liquid aerosol-forming substrate held in the liquid storage portion based on the electrical quantity measured between the pair of electrodes and the shape of the liquid aerosol-forming substrate,
wherein the liquid storage portion has a length and the pair of electrodes extend the length of the liquid storage portion, and
wherein the pair of electrodes are interdigitated electrodes.

2. The aerosol-generating system according to claim 1, wherein the pair of electrodes circumscribe the liquid storage portion.

3. The aerosol-generating system according to claim 1, wherein the pair of electrodes form a tubular sleeve that surrounds the liquid storage portion.

4. The aerosol-generating system according to claim 1, wherein the control system is further configured to prevent the determination of the amount of liquid aerosol-forming substrate held in the liquid storage portion based on the orientation information received from the sensor.

5. The aerosol-generating system according to claim 1, wherein the sensor is further configured to sense acceleration of the liquid storage portion.

6. The aerosol-generating system according to claim 5, wherein the sensor comprises one or more accelerometers configured to sense linear acceleration of the liquid storage portion.

7. The aerosol-generating system according to claim 5, wherein the sensor is an inertial measurement unit.

8. The aerosol-generating system according to claim 5, wherein the control system is further configured to:
receive acceleration information from the sensor; and
determine, based on the acceleration information received from the sensor, whether the liquid storage portion is in
a stable condition in which the liquid storage portion is stationary or travelling at a constant velocity, or
an unstable condition in which the liquid storage portion is subjected to acceleration.

9. The aerosol-generating system according to claim 8, wherein the control system is configured to:
determine that the liquid storage portion is in the stable condition in response to determining that the received acceleration information is below one or more threshold acceleration values; and
determine that the liquid storage portion is in the unstable condition in response to determining that the received acceleration information is above the one or more threshold acceleration values.

10. The aerosol-generating system according to claim 1, wherein the sensor comprises one or more gyroscopes configured to sense angular velocity of the liquid storage portion.

11. The aerosol-generating system according to claim 1, wherein the control system is configured to:
determine the amount of liquid aerosol-forming substrate held in the liquid storage portion when the liquid storage portion is determined to be in a stable condition; and
prevent the determination of the amount of liquid aerosol-forming substrate held in the liquid storage portion when the liquid storage portion is determined to be in an unstable condition.

12. The aerosol-generating system according to claim 1, wherein the liquid storage portion comprises a housing for holding the liquid aerosol-forming substrate and the pair of electrodes extend over a portion of a surface of the housing.

13. The aerosol-generating system according to claim 12, wherein,
the housing of the liquid storage portion includes two opposing ends and at least one sidewall extending between the opposing ends, and
the pair of electrodes extend over the one or more sidewalls of the housing of the liquid storage portion.

14. The aerosol-generating system according to claim 12, wherein the pair of electrodes are arranged on the housing of the liquid storage portion such that at least a portion of the liquid storage portion is arranged between the pair of electrodes.

15. The aerosol-generating system according to claim 1, wherein the aerosol-generating system further comprises:
a heater arranged to receive the liquid aerosol-forming substrate from the liquid storage portion; and
one or more electrical power sources arranged to supply power to the heater, and
wherein the control system is further configured to control the supplying of power from the one or more electrical power sources to the heater based on the determined orientation of the liquid storage portion.

* * * * *